(12) United States Patent
Hayata et al.

(10) Patent No.: US 7,553,605 B2
(45) Date of Patent: Jun. 30, 2009

(54) INK COMPOSITION, INKJET RECORDING METHOD, PRINTED MATERIAL, AND PROCESS FOR PRODUCING LITHOGRAPHIC PRINTING PLATE

(75) Inventors: Yuuichi Hayata, Kanagawa (JP); Ippei Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/822,061

(22) Filed: Jul. 2, 2007

(65) Prior Publication Data

US 2008/0008966 A1 Jan. 10, 2008

(30) Foreign Application Priority Data

| Jul. 3, 2006 | (JP) | ............................... 2006-183513 |
| Aug. 22, 2006 | (JP) | ............................... 2006-225105 |
| Nov. 15, 2006 | (JP) | ............................... 2006-309285 |

(51) Int. Cl.
G03F 7/00 (2006.01)
G03F 7/004 (2006.01)

(52) U.S. Cl. .............. 430/286.1; 430/270.1; 430/281.1; 430/300; 430/302; 430/916

(58) Field of Classification Search .............. 430/270.1, 430/300, 302
See application file for complete search history.

(56) References Cited

U.S. PATENT DOCUMENTS

| 6,217,510 B1 | 4/2001 | Ozawa et al. |
| 2003/0045598 A1 | 3/2003 | Chen et al. |
| 2004/0242735 A1 | 12/2004 | McMan et al. |
| 2007/0031758 A1* | 2/2007 | Nishikawa et al. ....... 430/270.1 |

FOREIGN PATENT DOCUMENTS

| DE | 38 19 414 C1 | 2/1989 |
| EP | 0 555 069 A1 | 8/1993 |
| EP | 1 433 822 A1 | 6/2004 |
| EP | 1 528 088 A1 | 5/2005 |
| EP | 1 621 594 A1 | 2/2006 |
| JP | 54-117203 A | 9/1979 |
| JP | 2-53701 | 4/1990 |
| JP | 03-165731 | 7/1991 |
| JP | 06-154155 | 6/1994 |
| JP | 09-038024 | 2/1997 |
| JP | 2880845 B2 | 1/1999 |
| JP | 11-104070 | 4/1999 |
| JP | 2001-525479 A | 12/2001 |
| JP | 2003-145573 A | 5/2003 |
| JP | 2003-210388 | 7/2003 |

| WO | WO 00/09332 A1 | 2/2000 |
| WO | WO 03/104182 A1 | 12/2003 |
| WO | WO 2004-514014 A | 5/2004 |

OTHER PUBLICATIONS

Partial European Search Report dated Sep. 6, 2007.
European Search Report dated Nov. 5, 2007.
N.S. Allan et al., "Chemistry & Technology of UV & EB Formulations For Coatings, Inks & Paints", vol. 2, 1991 Selective Industrial Training Associates Limited London, United Kingdom, pp. 239-307.

* cited by examiner

Primary Examiner—Amanda C. Walke
(74) Attorney, Agent, or Firm—Sughrue Mion, PLLC

(57) ABSTRACT

An ink composition is provided that includes (A) an N-vinyllactam, (B) a monomer represented by Formula (I), and (C) a radical polymerization initiator, or includes (A) an N-vinyllactam, (B) a monomer represented by Formula (II), (C) a radical polymerization initiator, and phenoxyethyl acrylate.

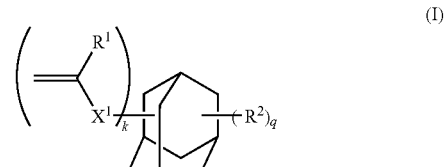

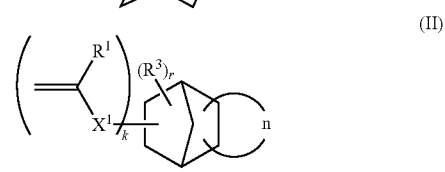

(In Formula (I) and Formula (II), $R^1$ denotes a hydrogen atom, a halogen atom, or an alkyl group having 1 to 4 carbons, $X^1$ denotes a divalent linking group, $R^2$ and $R^3$ independently denote a substituent, k denotes an integer of 1 to 6, q and r independently denote an integer of 0 to 5, n denotes a cyclic hydrocarbon structure, the cyclic hydrocarbon structure may comprise in addition to hydrocarbon bonds a carbonyl bond (—C(O)—) and/or an ester bond (—C(O)O—), and the k $R^1$s, the k $X^1$s, the q $R^2$s, and the r $R^3$s may each be identical to or different from each other; furthermore, one carbon atom in the adamantane framework in Formula (I) may be replaced by a carbonyl bond (—C(O)—) and/or an ester bond (—C(O)O—), and one carbon atom in the norbornene framework in Formula (II) may be replaced by an ether bond (—O—) and/or an ester bond (—C(O)O—).) There are also provided an inkjet recording method, a printed material, and a process for producing a lithographic printing plate that employ the ink composition.

15 Claims, No Drawings

INK COMPOSITION, INKJET RECORDING METHOD, PRINTED MATERIAL, AND PROCESS FOR PRODUCING LITHOGRAPHIC PRINTING PLATE

BACKGROUND OF THE INVENTION

1. Field of the Invention

The present invention relates to an ink composition suitably used for inkjet recording, an inkjet recording method and, furthermore, a printed material obtained by employing the ink composition and a process for producing a lithographic printing plate.

More particularly, it relates to an ink composition suitable for inkjet recording that enables inkjet recording to be carried out stably for a long period of time, cures with high sensitivity upon exposure to actinic radiation, and gives a cured material having sufficient flexibility even after the ink composition has been cured; an inkjet recording method; a printed material employing same; and a process for producing a lithographic printing plate employing the ink composition.

2. Description of the Related Art

With regard to an image recording method for forming an image on a recording medium such as paper based on an image data signal, there are an electrophotographic system, sublimation type and melt type thermal transfer systems, an inkjet system, etc. In the electrophotographic system, a process of forming an electrostatic latent image on a photosensitive drum by electrically charging and exposing is required, and the system is complicated; as a result, there is the problem that the production cost is high. With regard to the thermal transfer system, although the equipment is inexpensive, due to the use of an ink ribbon there is the problem that the running cost is high and waste material is generated.

On the other hand, with regard to the inkjet system, the equipment is inexpensive and, since an image is formed directly on a recording medium by discharging an ink composition only on a required image area, the ink composition can be used efficiently and the running cost is low. Furthermore, there is little noise and it is excellent as an image recording system.

With regard to an ink composition that can be cured by irradiation with radiation such as ultraviolet rays and, in particular, an inkjet recording ink composition (radiation curing type inkjet recording ink composition), there is a desire for an ink composition that cures with high sensitivity and forms an image with high image quality. By achieving higher sensitivity, high curability upon exposure to actinic radiation can be imparted, and there are therefore provided various benefits such as a reduction in power consumption, longer lifetime of an actinic radiation generator due to a decrease in the load thereon and, as a result of adequate curing being achieved, suppression of evaporation of uncured low molecular weight material and of a reduction in the strength of an image formed. Furthermore, there is a desire for an ink composition that gives an image (printed material) that is resistant to cracking, peeling off, etc., and gives a cured film that has excellent flexibility. A cured film having high flexibility enables a printed material to be displayed or stored for a long period of time in various environments while maintaining high image quality, and also has advantages such as ease of handling of the printed material. Furthermore, improvement in the image strength due to higher sensitivity imparts high plate life to an image when the ink composition is used for the formation of an image of a lithographic printing plate.

As an ink composition, an ink composition comprising an N-vinyllactam has been disclosed (Japanese Registered Patent No. 2880845). However, the ink composition described in this patent publication is a highly viscous ink composition containing a polymer and an oligomer as main ink components, and it is difficult to discharge by ink jet.

Furthermore, as an ink composition that can be cured by irradiation with radiation such as ultraviolet rays, an ink composition having excellent adhesion has been disclosed (Published Japanese translation of PCT application No. 2004-514014). However, the curability, the flexibility of a cured film, and the adhesion to a substrate of the cured film are not all fully satisfied.

Conventionally, when a lithographic printing plate is produced, a so-called PS plate having a constitution in which a lipophilic photosensitive resin layer is provided on a hydrophilic support is used; this photosensitive resin layer is imagewise exposed to light to thus improve or degrade the solubility of the exposed area toward an alkaline developer and form an image, and the non-image area is then dissolved and removed. However, in recent years, a digitization technique of electronically processing, storing and outputting image information using a computer has become widespread, and a new image output method that matches the above technique has been desired. In particular, a method that can produce a printing plate without a treatment employing a developer has been examined, and a process for directly producing a lithographic printing plate using an inkjet recording ink composition has been investigated (ref. e.g. JP-A-54-117203; JP-A denotes a Japanese unexamined patent publication application). In this process, an ink is discharged imagewise on the surface of a preferably hydrophilic support by an inkjet method, etc., and this is then cured by irradiation with actinic radiation, thereby giving a printing plate having a desired image (preferably a hydrophobic image). In order to form an image area of a lithographic printing plate, it is desirable that ink droplets discharged onto a support cure quickly without spreading, the cured image area has excellent strength and adhesion to the support, and the image area follows flexure of the support well when the lithographic printing plate is set in a printer to thus prevent any occurrence of damage such as cracking, and there is currently a desire for an ink composition that is suitable for such an application.

BRIEF SUMMARY OF THE INVENTION

It is an object of the present invention to provide an ink composition that has excellent curability toward irradiation with actinic radiation and for which an image obtained by curing the ink composition has excellent flexibility, and an inkjet recording method, a printed material, and a process for producing a lithographic printing plate that employ the ink composition.

The above-mentioned object has been accomplished by (1), (7), (9), and (10) below. (2) to (6) and (8), which are preferred embodiments, are also shown below.

(1) An ink composition comprising (A) an N-vinyllactam, (B) a monomer represented by Formula (I) or Formula (II), and (C) a radical polymerization initiator

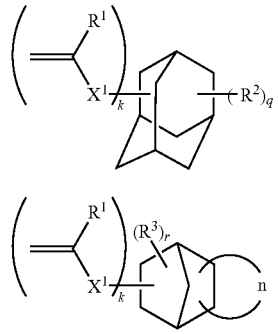

(in Formula (I) and Formula (II), $R^1$ denotes a hydrogen atom, a halogen atom, or an alkyl group having 1 to 4 carbons, $X^1$ denotes a divalent linking group, $R^2$ and $R^3$ independently denote a substituent, k denotes an integer of 1 to 6, q and r independently denote an integer of 0 to 5, n denotes a cyclic hydrocarbon structure, the cyclic hydrocarbon structure may comprise in addition to hydrocarbon bonds a carbonyl bond (—C(O)—) and/or an ester bond (—C(O)O—), and the k $R^1$s, the k $X^1$s, the q $R^2$s, and the r $R^3$s may each be identical to or different from each other; furthermore, one carbon atom in the adamantane framework in Formula (I) may be replaced by a carbonyl bond (—C(O)—) and/or an ester bond (—C(O)O—), and one carbon atom in the norbornene framework in Formula (II) may be replaced by an ether bond (—O—) and/or an ester bond (—C(O)O—)), (2) the ink composition according to (1) above, wherein at least one of the monomers represented by Formula (I) or Formula (II) is a monofunctional acrylate, (3) the ink composition according to (1) or (2) above, wherein the monomer represented by Formula (II) above is a monomer represented by Formula (III), Formula (IV), or Formula (V),

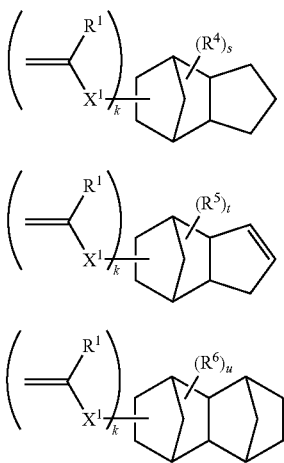

(in Formula (III), Formula (IV), and Formula (V), $R^1$ denotes a hydrogen atom, a halogen atom, or an alkyl group having 1 to 4 carbons, $X^1$ denotes a divalent linking group, $R^4$, $R^5$, and $R^6$ independently denote a substituent, k denotes an integer of 1 to 6, s, t, and u independently denote an integer of 0 to 5, and the s $R^4$s, the t $R^5$s, and the u $R^6$s may each be identical to or different from each other), (4) the ink composition according to any one of (1) to (3) above, wherein the N-vinyllactam (A) is N-vinylcaprolactam, (5) the ink composition according to any one of (1) to (4) above, wherein it comprises (D) a colorant, (6) the ink composition according to any one of (1) to (5) above, wherein it is for inkjet recording, (7) an inkjet recording method comprising ($a^1$) a step of discharging the ink composition according to any one of (1) to (6) above onto a recording medium, and ($b^1$) a step of curing the ink composition by irradiating the discharged ink composition with actinic radiation, (8) the inkjet recording method according to (7) above, wherein the actinic radiation is UV radiation having a peak light emission wavelength in the range of 350 to 420 nm and is emitted by a UV radiation-emitting light-emitting diode that gives a maximum illumination intensity on the surface of a recording medium of 10 to 2,000 mW/cm$^2$, (9) a printed material recorded by the inkjet recording method according to (7) or (8) above, and

(10) a process for producing a lithographic printing plate, the process comprising:

($a^2$) a step of discharging the ink composition according to any one of (1) to (6) above onto a hydrophilic support, and ($b^2$) a step of curing the ink composition by irradiating the discharged ink composition with actinic radiation so as to form a hydrophobic image on the hydrophilic support by curing the ink composition.

DETAILED DESCRIPTION OF THE INVENTION (1) Ink Composition

The ink composition of the present invention (hereinafter, also called simply an 'ink') comprises (A) an N-vinyllactam, (B) a monomer represented by Formula (I) or Formula (II), and (C) a radical polymerization initiator.

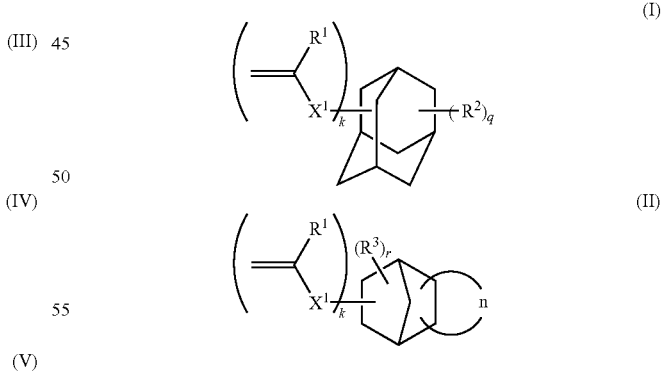

(In Formula (I) and Formula (II), $R^1$ denotes a hydrogen atom, a halogen atom, or an alkyl group having 1 to 4 carbons, $X^1$ denotes a divalent linking group, $R^2$ and $R^3$ independently denote a substituent, k denotes an integer of 1 to 6, q and r independently denote an integer of 0 to 5, n denotes a cyclic hydrocarbon structure, the cyclic hydrocarbon structure may comprise in addition to hydrocarbon bonds a carbonyl bond (—C(O)—) and/or an ester bond (—C(O)O—), and the k $R^1$s, the k $X^1$s, the q $R^2$s, and the r $R^3$s may each be identical to or different from each other; furthermore, one carbon atom in the adamantane framework in Formula (I) may be replaced by a carbonyl bond (—C(O)—) and/or an ester bond (—C(O)O—), and one carbon atom in the norbornene framework in Formula (II) may be replaced by an ether bond (—O—) and/or an ester bond (—C(O)O—).)

Furthermore, the ink composition of the present invention preferably comprises (D) a colorant, (E) a dispersant, and/or (F) a surfactant.

The present invention is explained in detail below.

The 'radiation' referred to in the present invention is not particularly limited as long as it is actinic radiation that can provide energy that enables an initiating species to be generated in the ink composition when irradiated, and broadly includes α rays, γ rays, X rays, ultraviolet rays (UV), visible light, and an electron beam; among these, ultraviolet rays and an electron beam are preferable from the viewpoint of curing sensitivity and the availability of equipment, and ultraviolet rays are particularly preferable. The ink composition of the present invention is therefore preferably an ink composition that can cure upon exposure to ultraviolet rays as radiation.

(A) N-vinyllactam

The ink composition of the present invention comprises an N-vinyllactam (hereinafter, also called component (A)).

Preferred examples of N-vinyllactams that can be used in the present invention include compounds represented by Formula (A-1) below.

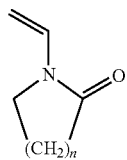

(A-1)

In Formula (A-1), n denotes an integer of 1 to 5; n is preferably an integer of 2 to 4 from the viewpoints of flexibility after the ink composition is cured, adhesion to a recording medium, and starting material availability, n is more preferably 2 or 4, and n is particularly preferably 4, which is N-vinylcaprolactam. N-Vinylcaprolactam is preferable since it has excellent safety, is commonly used and easily available at a relatively low price, and gives particularly good ink curability and adhesion of a cured film to a recording medium.

The N-vinyllactam may have a substituent such as an alkyl group or an aryl group on the lactam ring, and may have a saturated or unsaturated ring structure bonded thereto.

The ink composition of the present invention preferably comprises the N-vinyllactam at least 5 wt % of the entire ink, more preferably at least 5 wt % but no greater than 40 wt %, and yet more preferably at least 10 wt % but no greater than 40 wt %. When the amount of N-vinyllactam used is in the above-mentioned range, the curability, the flexibility of a cured film, and the adhesion to a substrate of a cured film are excellent.

The N-vinyllactam is a compound having a relatively high melting point. It is preferable for the content of the N-vinyllactam to be no greater than 40 wt % since good solubility is exhibited even at a low temperature of 0° C. or less and the temperature range in which the ink composition can be handled becomes large.

The N-vinyllactam may be contained in the ink composition singly or in a combination of a plurality of types thereof.

(B) Monomer Represented by Formula (I) or Formula (II)

The ink composition of the present invention comprises the monomer represented by Formula (I) or Formula (II) (hereinafter, also called component (B)). The monomer represented by Formula (I) or Formula (II) is preferably an addition polymerizable monomer, and more preferably a radically polymerizable monomer.

$R^1$ in Formula (I) or Formula (II) denotes a hydrogen atom, a halogen atom, or an alkyl group having 1 to 4 carbons, is preferably a hydrogen atom or an alkyl group having 1 to 4 carbons from the viewpoint starting material availability, and is more preferably a hydrogen atom or a methyl group. Furthermore, the k $R^1$s may be identical to or different from each other.

$X^1$ in Formula (I) or Formula (II) denotes a divalent linking group, and is preferably an ether group (—O—), an ester group (—C(O)O— or —OC(O)—), an amide group (—C(O)NR'—), a carbonyl group (—C(O)—), a nitrogen atom (—NR'—), an optionally substituted alkylene group having 1 to 15 carbons, or a divalent group in which 2 or more thereof are combined. Moreover, R' denotes a hydrogen atom, a straight-chain, branched, or cyclic alkyl group having 1 to 20 carbons, or an aryl group having 6 to 20 carbons. The k $X^1$s may be identical to or different from each other.

Furthermore, a terminal portion of $X^1$ that is bonded to the vinyl group in Formula (I) or Formula (II) is preferably an ester group or amide group in which a carbonyl carbon of $X^1$ and a vinyl group are bonded, and in this case another portion of $X^1$ that is bonded to the adamantane framework or the norbornene framework may be a single bond or may be selected freely from the above-mentioned groups.

The substitution number k of the vinyl portion ($H_2C$=C ($R^1$)—$X^1$—) containing $R^1$ and $X^1$ in Formula (I) or Formula (II) denotes an integer of 1 to 6. The vinyl portion containing $R^1$ and $X^1$ may be bonded at any position to each alicyclic hydrocarbon structure. Here, 'to each alicyclic hydrocarbon structure' means to the adamantane structure in Formula (I), to the norbornene structure in Formula (II), and to the cyclic hydrocarbon structure containing n.

Furthermore, from the viewpoint of improving the affinity with a colorant, a terminal portion of $X^1$ that is bonded to the alicyclic hydrocarbon structure in Formula (I) or Formula (II) is preferably an oxygen atom, and more preferably an ether type oxygen atom, and $X^1$ in Formula (I) or Formula (II) is yet more preferably —C(O)O($CH_2CH_2O)_p$— (p denotes 1 or 2).

$R^2$ and $R^3$ in Formula (I) or Formula (II) independently denote a substituent that may be bonded to any position on each of the alicyclic hydrocarbon structures. Furthermore, the q $R^2$s and the r $R^3$s may each be identical to or different from each other.

The q $R^2$s and the r $R^3$s may independently be a monovalent or polyvalent substituent; the monovalent substituent is preferably a hydrogen atom, a hydroxyl group, a substituted or unsubstituted amino group, a thiol group, a siloxane group, or an optionally substituted hydrocarbon group or heterocyclic group having a total number of carbons of 30 or less, and a divalent substituent is preferably an oxy group (=O).

The substitution number q for $R^2$ denotes an integer of 0 to 5, and the substitution number r for $R^3$ denotes an integer of 0 to 5.

n in Formula (II) denotes a cyclic hydrocarbon structure; opposite ends thereof may substitute any position of the norbornene framework, it may be a monocyclic structure or a polycyclic structure, and it may comprise as the cyclic hydrocarbon structure a carbonyl bond (—C(O)—) and/or an ester bond (—C(O)O—) in addition to hydrocarbon bonds.

Furthermore, one carbon atom of the adamantane framework in Formula (I) may be replaced by a carbonyl bond (—C(O)—) and/or an ester bond (—C(O)O—), and one carbon atom of the norbornene framework in Formula (II) may be replaced by an ether bond (—O—) and/or an ester bond (—C(O)O—).

The monomer represented by Formula (I) or Formula (II) is preferably a monomer represented by Formula (III), Formula (IV), or Formula (V).

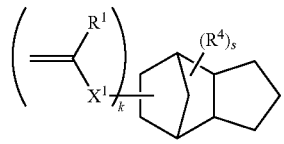
(III)

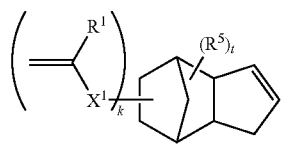
(IV)

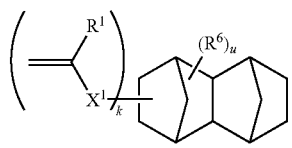
(V)

(In Formula (III), Formula (IV), and Formula (V), $R^1$ denotes a hydrogen atom, a halogen atom, or an alkyl group having 1 to 4 carbons, $X^1$ denotes a divalent linking group, $R^4$, $R^5$, and $R^6$ independently denote a substituent, k denotes an integer of 1 to 6, s, t, and u independently denote an integer of 0 to 5, and the s $R^4$s, the t $R^5$s, and the u $R^6$s may each be identical to or different from each other.)

$R^1$, $X^1$, and k in Formula (III), Formula (IV), or Formula (V) have the same meanings as those for $R^1$, $X^1$, and k in Formula (I) or Formula (II), and preferred ranges are also the same.

The vinyl portion containing $R^1$ and $X^1$ in Formula (III), Formula (IV), or Formula (V) may be bonded to any position on each of the alicyclic hydrocarbon structures shown below in Formula (III), Formula (IV), or Formula (V).

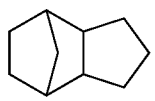 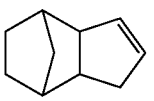 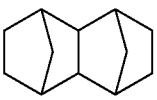

$R^4$, $R^5$, and $R^6$ in Formula (III), Formula (IV), and Formula (V) independently denote a substituent, and may be bonded to any position of the respective alicyclic hydrocarbon structures in Formula (III), Formula (IV), and Formula (V). The substituents $R^4$, $R^5$, and $R^6$ have the same meaning as that of the substituents $R^2$ and $R^3$ of Formula (I) or Formula (II), and preferred ranges are also the same.

s, t, and u in Formula (III), Formula (IV), or Formula (V) independently denote an integer of 0 to 5, and the s $R^4$s, the t $R^5$s, and the u $R^6$s may each be identical to or different from each other.

As the monomer represented by Formula (I) or Formula (II), specific preferred examples of monofunctional acrylates are shown below.

In some of the compound examples below, a hydrocarbon chain is expressed by a simplified structural formula in which symbols for carbon (C) and hydrogen (H) are omitted.

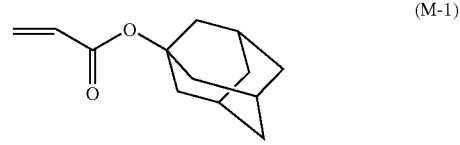
(M-1)

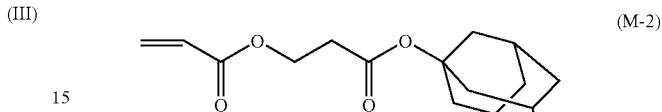
(M-2)

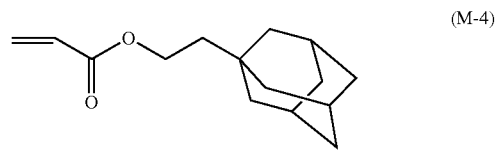
(M-4)

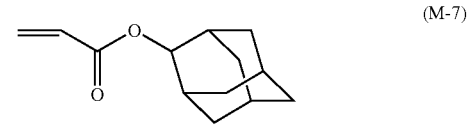
(M-7)

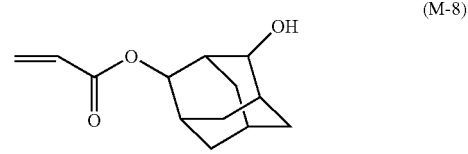
(M-8)

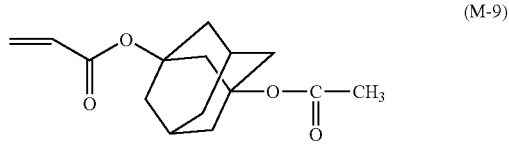
(M-9)

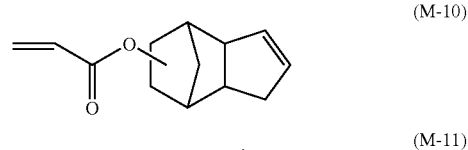
(M-10)

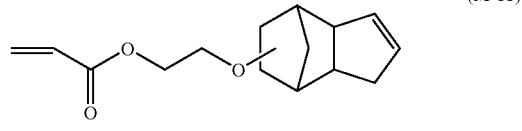
(M-11)

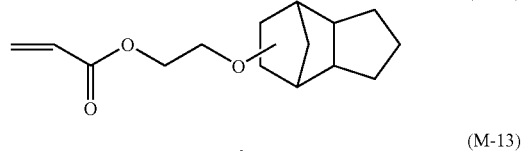
(M-12)

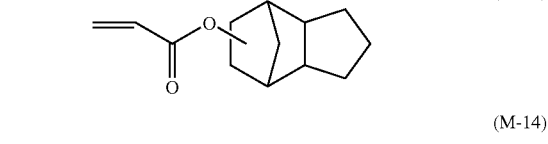
(M-13)

(M-14)

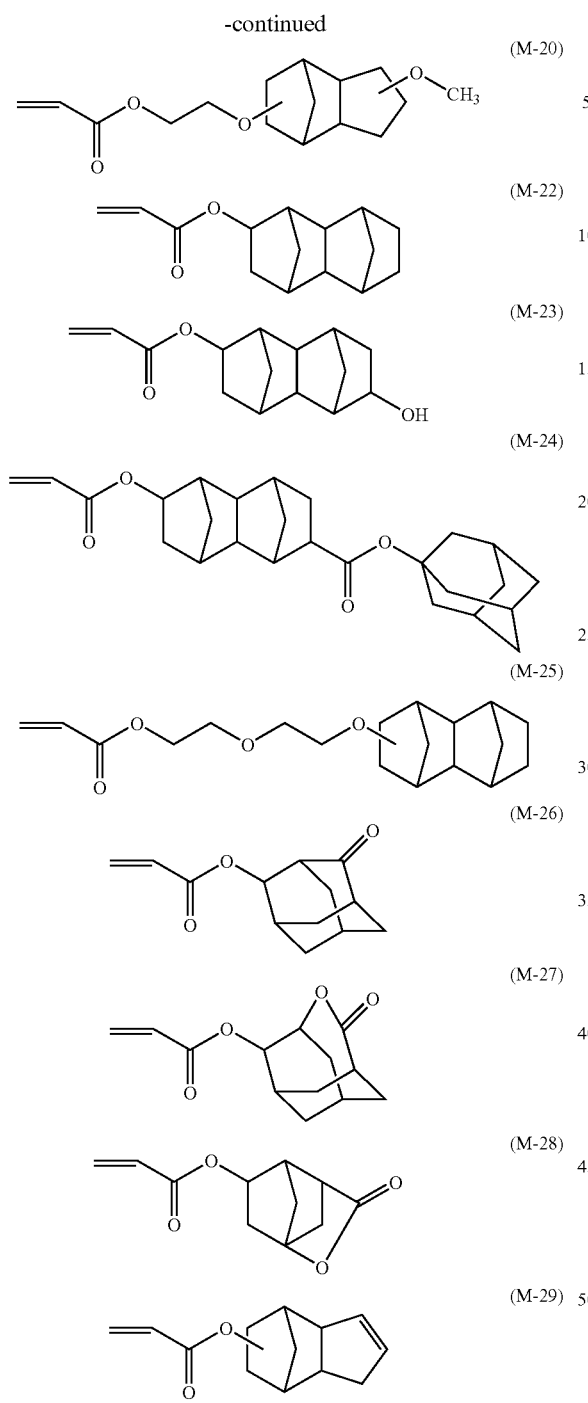

As the monomer represented by Formula (I) or Formula (II), specific preferred examples of monofunctional methacrylates are shown below.

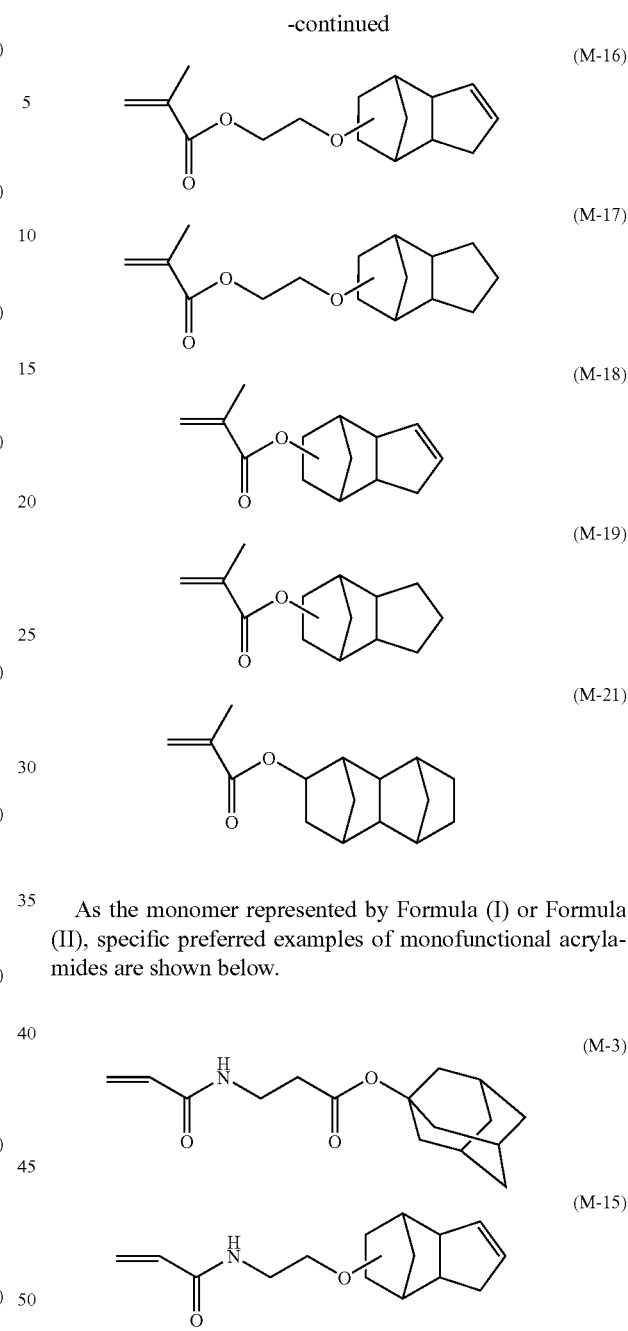

As the monomer represented by Formula (I) or Formula (II), specific preferred examples of monofunctional acrylamides are shown below.

As the monomer represented by Formula (I) or Formula (II), specific preferred examples of monofunctional vinyl ethers are shown below.

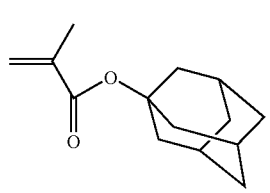

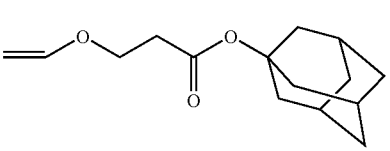

Specific preferred examples of polyfunctional acrylates represented by Formula (I) or Formula (II) are shown below.

(M-30) 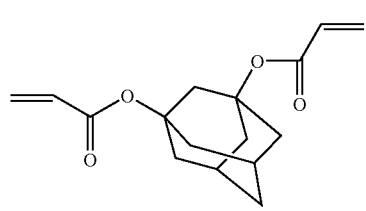

(M-31) 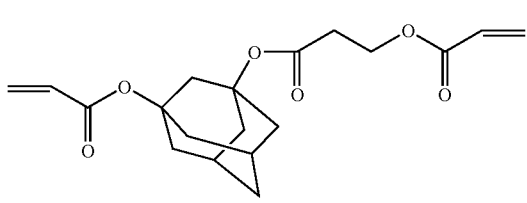

(M-32) 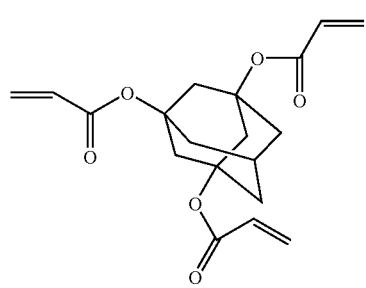

(M-33) 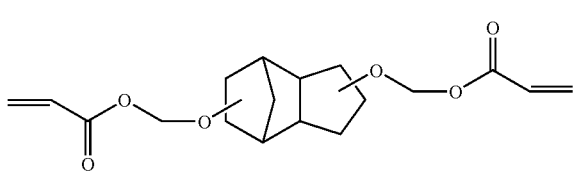

(M-34) 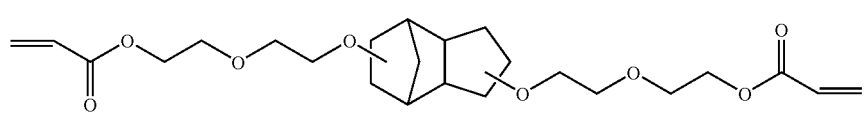

(M-35) 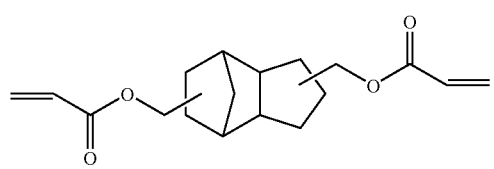

(M-36) 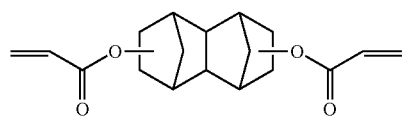

(M-37) 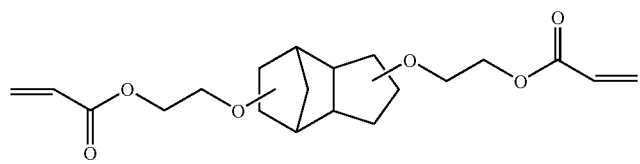

(M-38)

(M-41)

Specific preferred examples of polyfunctional methacrylates represented by Formula (I) or Formula (II) are shown below.

-continued (M-40) 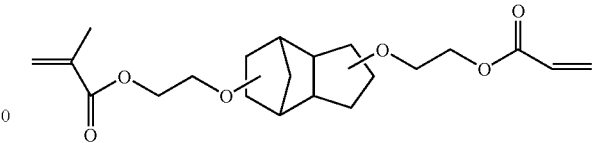

(M-39) 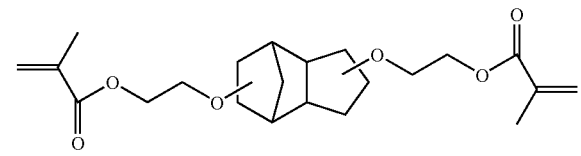

Among these monofunctional monomers and polyfunctional monomers, it is particularly preferable to use, as the monomer (B) represented by Formula (I) or Formula (II) in the ink composition of the present invention, M-1, M-10, M-11, M-12, M-13, M-16, or M-35.

The amount of monomer (B) represented by Formula (I) or Formula (II) in the ink composition of the present invention is preferably 0.5 to 90 wt % relative to the total amount of the ink composition, more preferably 2 to 70 wt %, and yet more preferably 10 to 50 wt %. It is preferable for the amount to be in the above-mentioned range since the curability is excellent and the viscosity is appropriate.

It is preferable that at least one of the monomers (B) represented by Formula (I) or Formula (II) in the ink composition of the present invention is a monofunctional monomer, and it is more preferable that at least one thereof is a monofunctional acrylate. It is preferable to use a monofunctional monomer since sufficient flexibility for a cured film as well as sufficient curability can be obtained.

When the ink composition of the present invention comprises a monofunctional acrylate, a monofunctional methacrylate, a monofunctional acrylamide, or a monofunctional vinyl ether represented by Formula (I) or Formula (II), the proportion of the monofunctional acrylate, the monofunctional methacrylate, the monofunctional acrylamide, or the monofunctional vinyl ether in the ink composition is preferably 1 to 90 wt %, more preferably 2 to 70 wt %, and yet more preferably 10 to 50 wt %. It is preferable for the proportion to be in the above-mentioned range since the curability and flexibility are excellent and the viscosity is appropriate.

When the ink composition of the present invention comprises a monomer having at least two functional groups, selected from an acrylate, a methacrylate, and an acrylamide represented by Formula (I) or Formula (II), the proportion of the monomer in the ink composition is preferably 0.5 to 15 wt %, more preferably 0.5 to 10 wt %, and yet more preferably 0.5 to 5 wt %. It is preferable for the proportion to be in the above-mentioned range since the curability and flexibility are excellent and the viscosity is appropriate.

The proportion of a polyfunctional acrylate having at least two acrylate groups in the ink composition of the present invention is preferably 0 to 15 wt %, more preferably 0 to 10 wt %, and yet more preferably 0 to 5 wt %. When the proportion is in the above-mentioned range, an ink composition that gives a cured film having excellent flexibility can be provided.

(C) Radical Polymerization Initiator

The ink composition of the present invention comprises a radical polymerization initiator.

As a polymerization initiator that can be used in the present invention, a known radical polymerization initiator may be used, and it is preferable to use a radical polymerization initiator. The radical polymerization initiator that can be used in the present invention may be used singly or in a combination of two or more types. Furthermore, the radical polymerization initiator may be used in combination with a cationic polymerization initiator.

The polymerization initiator that can be used in the ink composition of the present invention is a compound that forms a polymerization initiating species by absorbing external energy. The external energy used for initiating polymerization can be broadly divided into heat and actinic radiation, and a thermal polymerization initiator and a photopolymerization initiator are used respectively. Examples of the actinic radiation include γ rays, β rays, an electron beam, ultraviolet rays, visible light, and infrared rays. In the present invention, the external energy used for initiating polymerization is preferably actinic radiation, more preferably the electron beam or ultraviolet rays, and yet more preferably ultraviolet rays.

Examples of the radical polymerization initiator that can be used in the present invention include (a) an aromatic ketone, (b) an acylphosphine compound, (c) an aromatic onium salt compound, (d) an organic peroxide, (e) a thio compound, (f) a hexaarylbiimidazole compound, (g) a ketoxime ester compound, (h) a borate compound, (i) an azinium compound, (j) a metallocene compound, (k) an active ester compound, (l) a compound having a carbon-halogen bond, and (m) an alkylamine compound. With regard to these radical polymerization initiators, the above-mentioned compounds (a) to (m) may be used singly or in combination. The radical polymerization initiator in the present invention may suitably be used singly or in a combination of two or more types.

Preferred examples of the aromatic ketone (a) and the thio compound (e) include a compound having a benzophenone skeleton (benzophenone compound) or a compound having a thioxanthone skeleton (thioxanthone compound) described in 'RADIATION CURING IN POLYMER SCIENCE AND TECHNOLOGY' J. P. FOUASSIER and J. F. RABEK (1993), pp. 77 to 117. Preferred examples of the aromatic ketone (a), the acylphosphine compound (b), and the thio compound (e) include an α-thiobenzophenone compound described in JP-B-47-6416, a benzoin ether compound described in JP-B-47-3981, an α-substituted benzoin compound described in JP-B-47-22326, a benzoin derivative described in JP-B-47-23664, an aroylphosphonic acid ester described in JP-A-57-30704, a dialkoxybenzophenone described in JP-B-60-26483, benzoin ethers described in JP-B-60-26403 and JP-A-62-81345, α-aminobenzophenones described in JP-B-1-34242, U.S. Pat. No. 4,318,791, and EP No. 0284561A1, p-di(dimethylaminobenzoyl)benzene described in JP-A-2-211452, a thio-substituted aromatic ketone described in JP-A-61-194062, an acylphosphine sulfide described in JP-B-2-9597, an acylphosphine described in JP-B-2-9596, a thioxanthone described in JP-B-63-61950, and a coumarin described in JP-B-59-42864.

As the aromatic onium salt compound (c), there can be cited aromatic onium salts of elements of Groups 15, 16, and 17 of the periodic table, specifically, N, P, As, Sb, Bi, O, S, Se, Te, and I. Examples thereof include iodonium salts described in EP No. 104143, U.S. Pat. No. 4,837,124, JP-A-2-150848, and JP-A-2-96514, diazonium salts (optionally substituted benzenediazoniums, etc.) described in EP Nos. 370693, 233567, 297443, 297442, 279210, and 422570, U.S. Pat. Nos. 3,902,144, 4,933,377, 4,760,013, 4,734,444, and 2,833,827, diazonium salt resins (diazodiphenylamine formaldehyde resins, etc.), N-alkoxypyridinium salts, etc. (e.g. those described in U.S. Pat. No. 4,743,528, JP-A-63-138345, JP-A-63-142345, JP-A-63-142346, and JP-B-46-42363; specific examples thereof include 1-methoxy-4-phenylpyridinium tetrafluoroborate); furthermore, compounds described in JP-B-52-147277, 52-14278, and 52-14279 may suitably be used. A radical or an acid is formed as an active species.

As the organic peroxide (d), almost all organic compounds having at least one oxygen-oxygen bond per molecule can be cited, and preferred examples thereof include peroxide ester compounds such as 3,3',4,4'-tetra(t-butylperoxycarbonyl)benzophenone, 3,3',4,4'-tetra(t-amylperoxycarbonyl)benzophenone, 3,3',4,4'-tetra(t-hexylperoxycarbonyl)benzophenone, 3,3',4,4'-tetra(t-octylperoxycarbonyl)benzophenone, 3,3',4,4'-tetra(cumylperoxycarbonyl)benzophenone, 3,3',4,4'-tetra(p-isopropylcumylperoxycarbonyl)benzophenone, and di-t-butyldiperoxyisophthalate.

As the hexaarylbiimidazole compound (f), there can be cited lophine dimers described in JP-B-45-37377 and JP-B-44-86516, and examples thereof include 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl)

biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole, and 2,2'-bis(o-trifluorophenyl)-4,4', 5,5'-tetraphenylbiimidazole.

As the ketoxime ester compound (g), there can be cited 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxyiminobutan-2-one, and 2-ethoxycarbonyloxyimino-1-phenylpropan-1-one.

Examples of the borate compound (h) include compounds described in U.S. Pat. Nos. 3,567,453 and 4,343,891, and EP Nos. 109,772 and 109,773.

Examples of the azinium compound (I) include N—O bond-containing compounds described in JP-A-63-138345, JP-A-63-142345, JP-A-63-142346, JP-A-63-143537, and JP-B-46-42363.

Examples of the metallocene compound (j) include titanocene compounds described in JP-A-59-152396, JP-A-61-151197, JP-A-63-41484, JP-A-2-249, and JP-A-2-4705, and iron-arene complexes described in JP-A-1-304453 and JP-A-1-152109.

Specific examples of the titanocene compound include dichlorobis(cyclopentadienyl)titanium, bis(cyclopentadienyl)bis(phenyl)titanium, bis(cyclopentadienyl)bis(2,3,4,5,6-pentafluorophen-1-yl)titanium, bis(cyclopentadienyl)bis(2,3,5,6-tetrafluorophen-1-yl)titanium, bis(cyclopentadienyl)bis(2,4,6-trifluorophen-1-yl)titanium, bis(cyclopentadienyl)bis(2,6-difluorophen-1-yl)titanium, bis(cyclopentadienyl)bis(2,4-difluorophen-1-yl)titanium, bis(methylcyclopentadienyl)bis(2,3,4,5,6-pentafluorophen-1-yl)titanium, bis(methylcyclopentadienyl)bis(2,3,5,6-tetrafluorophen-1-yl)titanium, bis(methylcyclopentadienyl)bis(2,4-difluorophen-1-yl)titanium, bis(cyclopentadienyl)bis[2,6-difluoro-3-(pyrr-1-yl)phenyl]titanium, bis(cyclopentadienyl)bis[2,6-difluoro-3-(methylsulfonamido)phenyl]titanium, and bis(cyclopentadienyl)bis[2,6-difluoro-3-(N-butylbiaroylamino)phenyl]titanium.

Examples of the active ester compound (k) include nitrobenzyl ester compounds described in EP Nos. 0290750, 046083, 156153, 271851, and 0388343, U.S. Pat. Nos. 3,901,710 and 4,181,531, JP-A-60-198538, and JP-A-53-133022, iminosulfonate compounds described in EP Nos. 0199672, 84515, 199672, 044115, and 0101122, U.S. Pat. Nos. 4,618, 564, 4,371,605, and 4,431,774, JP-A-64-18143, JP-A-2-245756, and JP-A-4-365048, and compounds described in JP-B-62-6223, JP-B-63-14340, and JP-A-59-174831.

Preferred examples of the compound (I) having a carbon-halogen bond include a compound described in Wakabayashi et. al, Bull. Chem. Soc. Japan, 42, 2924 (1969), a compound described in British Patent No. 1388492, a compound described in JP-A-53-133428, and a compound described in German Patent No. 3337024.

Examples further include a compound described in F. C. Schaefer et al., J. Org. Chem., 29, 1527 (1964), a compound described in JP-A-62-58241, a compound described in JP-A-5-281728, a compound described in German Pat. No. 2641100, a compound described in German Pat. No. 3333450, compounds described in German Pat. No. 3021590, and compounds described in German Pat. No. 3021599.

In the ink composition of the present invention, the total amount of radical polymerization initiator used is preferably 0.01 to 35 wt % relative to the total amount of polymerizable compound, including an N-vinyllactam and a monomer represented by Formula (I) or Formula (II), used, more preferably 0.5 to 20 wt %, and yet more preferably 1.0 to 15 wt %. The ink composition can be cured with 0.01 wt % or greater of the polymerization initiator, and a cured film having a uniform degree of curing can be obtained with 35 wt % or less.

Furthermore, when a sensitizing dye, which will be described later, is used in the ink composition of the present invention, the total amount of radical polymerization initiator used is preferably 200:1 to 1:200 relative to the sensitizing dye as a ratio by weight of polymerization initiator:sensitizing dye, more preferably 50:1 to 1:50, and yet more preferably 20:1 to 1:5.

(D) Colorant

Although it is not particularly necessary to form a colored image when the ink composition of the present invention is used for formation of an image area of a lithographic printing plate, etc., in order to improve the visibility of an image area that is formed or in an attempt to form a colored image using the ink composition, it may contain a colorant.

The colorant that can be used in the present invention is not particularly limited, but a pigment and an oil-soluble dye that have excellent weather resistance and rich color reproduction are preferable, and it may be selected from any known colorant such as a soluble dye. It is preferable that the colorant that can be suitably used in the ink composition or the inkjet recording ink composition of the present invention does not function as a polymerization inhibitor in a polymerization reaction, which is a curing reaction. This is because the sensitivity of the curing reaction by actinic radiation should not be degraded.

Pigment

The pigment that can be used in the present invention is not particularly limited and, for example, organic and inorganic pigments having the numbers below described in the Color Index may be used.

That is, as a red or magenta pigment, Pigment Red 3, 5, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, or 257, Pigment Violet 3, 19, 23, 29, 30, 37, 50, or 88, and Pigment Orange 13, 16, 20, or 36;

as a blue or cyan pigment, Pigment Blue 1, 15, 15:1, 15:2, 15:3, 15:4, 15:6, 16, 17-1, 22, 27, 28, 29, 36, or 60;

as a green pigment, Pigment Green 7, 26, 36, or 50;

as a yellow pigment, Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, or 193;

as a black pigment, Pigment Black 7, 28, or 26;

as a white pigment, Pigment White 6, 18, or 21, etc. may be used according to the intended application.

Oil-soluble Dye

The oil-soluble dye that can be used in the present invention is explained below.

The oil-soluble dye that can be used in the present invention means a dye that is substantially insoluble in water. Specifically, the solubility in water at 25° C. (the mass of dye that can be dissolved in 100 g of water) is no greater than 1 g, preferably no greater than 0.5 g, and more preferably no greater than 0.1 g. Therefore, the oil-soluble dye means a so-called water-insoluble pigment or an oil-soluble dye, and among these the oil-soluble dye is preferable.

Among the oil-soluble dyes that can be used in the present invention, as a yellow dye, any may be used. Examples thereof include aryl or heteryl azo dyes having a coupling component such as a phenol, a naphthol, an aniline, a pyrazolone, a pyridone, or an open-chain active methylene compound; azomethine dyes having a coupling component such as an open-chain active methylene compound; methine dyes such as benzylidene dyes and monomethineoxonol dyes; quinone dyes such as naphthoquinone dyes and anthraquinone dyes; and other dye species such as quinophthalone dyes, nitro/nitroso dyes, acridine dyes, and acridinone dyes.

Among the above-mentioned oil-soluble dyes that can be used in the present invention, as a magenta dye, any may be used. Examples thereof include aryl or heteryl azo dyes having a coupling component such as a phenol, a naphthol, or an aniline; azomethine dyes having a coupling component such as a pyrazolone or a pyrazolotriazole; methine dyes such as arylidene dyes, styryl dyes, merocyanine dyes, and oxonol dyes; carbonium dyes such as diphenylmethane dyes, triphenylmethane dyes, and xanthene dyes; quinone dyes such as naphthoquinones, anthraquinones, or anthrapyridones; and condensed polycyclic dyes such as dioxazine dyes.

Among the oil-soluble dyes that can be used in the present invention, as a cyan dye, any may be used. Examples thereof include indoaniline dyes, indophenol dyes, and azomethine dyes having a coupling component such as a pyrrolotriazole; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl or heteryl azo dyes having a coupling component such as a phenol, a naphthol, or an aniline; and indigo/thioindigo dyes.

The above-mentioned dyes may be dyes that exhibit respective colors of yellow, magenta, and cyan only after a part of the chromophore dissociates, and in that case the counter cation may be an inorganic cation such as an alkali metal or ammonium, may be an organic cation such as pyridinium or a quaternary ammonium salt, or may be a polymer cation having the above cation as a partial structure.

Although not limited to the following, preferred specific examples thereof include CI Solvent Black 3, 7, 27, 29, and 34; CI Solvent Yellow 14, 16, 19, 29, 30, 56, 82, 93, and 162; CI Solvent Red 1, 3, 8, 18, 24, 27, 43, 49, 51, 72, 73, 109, 122, 132, and 218; CI Solvent Violet 3; CI Solvent Blue 2, 11, 25, 35, 38, 67, and 70; CI Solvent Green 3 and 7; and CI Solvent Orange 2.

Particularly preferred examples thereof include Nubian Black PC-0850, Oil Black HBB, Oil Yellow 129, Oil Yellow 105, Oil Pink 312, Oil Red 5B, Oil Scarlet 308, Vali Fast Blue 2606, Oil Blue BOS (manufactured by Orient Chemical Industries, Ltd.), Aizen Spilon Blue GNH (manufactured by Hodogaya Chemical Co., Ltd.), Neopen Yellow 075, Neopen Magenta SE1378, Neopen Blue 808, Neopen Blue FF4012, and Neopen Cyan FF4238 (manufactured by BASF).

In the present invention, the oil-soluble dye may be used singly or in a combination of two or more types.

Furthermore, another colorant such as a water-soluble dye, a disperse dye, or a pigment may be contained as necessary in a range that does not interfere with the effects of the present invention.

In the present invention, a disperse dye may be used in a range that enables it to be dissolved in a water-immiscible organic solvent. Disperse dyes generally include water-soluble dyes, but in the present invention it is preferable for the disperse dye to be used in a range such that it dissolves in a water-immiscible organic solvent. Specific preferred examples of the disperse dye include CI Disperse Yellow 5, 42, 54, 64, 79, 82, 83, 93, 99, 100, 119, 122, 124, 126, 160, 184:1, 186, 198, 199, 201, 204, 224, and 237; CI Disperse Orange 13, 29, 31:1, 33, 49, 54, 55, 66, 73, 118, 119, and 163; CI Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; CI Disperse Violet 33; CI Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and CI Disperse Green 6:1 and 9.

The colorant that can be used in the present invention is preferably added to the ink composition or the inkjet recording ink composition of the present invention and then dispersed in the ink to an appropriate degree. For dispersion of the colorant, for example, a dispersing machine such as a ball mill, a sand mill, an attritor, a roll mill, an agitator, a Henschel mixer, a colloidal mill, an ultrasonic homogenizer, a pearl mill, a wet type jet mill, or a paint shaker may be used.

The colorant may be added directly to the ink composition of the present invention, but in order to improve dispersibility it may be added in advance to a solvent or a dispersing medium such as a radically polymerizable compound used in the present invention.

In the present invention, in order to avoid the problem of the solvent resistance being degraded when the solvent remains in the cured image and the VOC (Volatile Organic Compound) problem of the residual solvent, it is preferable to add the colorant in advance to a dispersing medium such as a radically polymerizable compound. As a polymerizable compound used, it is preferable in terms of dispersion suitability to select a monomer having the lowest viscosity.

These colorants may be used by appropriately selecting one type or two or more types according to the intended purpose of the ink composition.

When a colorant such as a pigment that is present as a solid in the ink composition of the present invention is used, it is preferable for the colorant, the dispersant, the dispersing medium, dispersion conditions, and filtration conditions to be set so that the average particle size of colorant particles is preferably 0.005 to 0.5 µm, more preferably 0.01 to 0.45 µm, and yet more preferably 0.015 to 0.4 µm. By such control of particle size, clogging of a head nozzle can be suppressed, and the ink storage stability, the ink transparency, and the curing sensitivity can be maintained.

The content of the colorant in the ink composition of the present invention is appropriately selected according to the color and the intended purpose, and is generally preferably 0.01 to 30 wt % relative to the weight of the entire ink composition.

(E) Dispersant

It is preferable to add a dispersant when dispersing the colorant. The type of dispersant is not particularly limited, but it is preferable to use a polymeric dispersant. Examples of the polymeric dispersant include polymeric dispersants such as DisperBYK-101, DisperBYK-102, DisperBYK-103, DisperBYK-106, DisperBYK-111, DisperBYK-161, DisperBYK-162, DisperBYK-163, DisperBYK-164, DisperBYK-166, DisperBYK-167, DisperBYK-168, DisperBYK-170, DisperBYK-171, DisperBYK-174, and DisperBYK-182 (all manufactured by BYK Chemie), EFKA4010, EFKA4046, EFKA4080, EFKA5010, EFKA5207, EFKA5244, EFKA6745, EFKA6750, EFKA7414, EFKA7462, EFKA7500, EFKA7570, EFKA7575, and EFKA7580 (all manufactured by EFKA Additives), Disperse Aid 6, Disperse Aid 8, Disperse Aid 15, and Disperse Aid 9100 (manufactured by San Nopco Limited); various types of Solsperse dispersants such as Solsperse 3000, 5000, 9000, 12000, 13240, 13940, 17000, 24000, 26000, 28000, 32000, 36000, 39000, 41000, and 71000 (manufactured by Avecia); Adeka Pluronic L31, F38, L42, L44, L61, L64, F68, L72, P95, F77, P84, F87, P94, L101, P103, F108, L121, and P-123 (manufactured by Adeka Corporation), Isonet S-20 (manufactured by Sanyo Chemical Industries, Ltd.), and Disparlon KS-860, 873SN, and 874 (polymeric dispersant), #2150 (aliphatic poly carboxylic acid), and #7004 (polyether ester type) (manufactured by Kusumoto Chemicals, Ltd.).

It is also possible to use in combination a pigment derivative such as a phthalocyanine derivative (product name: EFKA-745 (manufactured by EFKA)), or Solsperse 5000, 12000, or 22000 (manufactured by Avecia).

The content of the dispersant in the ink composition of the present invention is appropriately selected according to the intended purpose, and is generally preferably 0.01 to 5 wt % relative to the weight of the entire ink composition.

(F) Surfactant

It is preferable to add a surfactant to the ink composition of the present invention in order to impart long-term discharge stability.

As the surfactant, those described in JP-A-62-173463 and JP-A-62-183457 can be cited. Examples thereof include anionic surfactants such as dialkylsulfosuccinic acid salts, alkylnaphthalenesulfonic acid salts, and fatty acid salts, nonionic surfactants such as polyoxyethylene alkyl ethers, polyoxyethylene alkyl allyl ethers, acetylene glycols, and polyoxyethylene/polyoxypropylene block copolymers, and cationic surfactants such as alkylamine salts and quaternary ammonium salts. An organofluoro compound or a polysiloxane compound may be used as the above-mentioned surfactant. The organofluoro compound is preferably hydrophobic. Examples of the organofluoro compound include fluorine-based surfactants, oil-like fluorine-based compounds (e.g. fluorine oils), solid fluorine compound resins (e.g. tetrafluoroethylene resin), and those described in JP-B-57-9053 (columns 8 to 17) and JP-A-62-135826. As the polysiloxane compound, a modified polysiloxane compound in which an organic group is introduced into some methyl groups of dimethyl polysiloxane is preferable. Modification examples include polyether-modified, methylstyrene-modified, alcohol-modified, alkyl-modified, aralkyl-modified, fatty acid ester-modified, epoxy-modified, amine-modified, amino-modified, and mercapto-modified, but are not limited thereto. These methods for modification may be used in combination. Among them, polyether-modified polysiloxane compounds are preferable from the viewpoint of improvement in inkjet discharge stability. Examples of the polyether-modified polysiloxane compounds include SILWET L-7604, SILWET L-7607N, SILWET FZ-2104, and SILWET FZ-2161 (manufactured by Nippon Unicar Co., Ltd.), BYK-306, BYK-307, BYK-331, BYK-333, BYK-347, and BYK-348 (manufactured by BYK Chemie), and KF-351A, KF-352A, KF-353, KF-354L, KF-355A, KF-615A, KF-945, KF-640, KF-642, KF-643, KF-6020, X-22-6191, X-22-4515, KF-6011, KF-6012, KF-6015, and KF-6017 (manufactured by Shin-Etsu Chemical Co., Ltd.).

The content of the surfactant in the ink composition of the present invention is appropriately selected according to the intended purpose and is generally preferably 0.0001 to 1 wt % relative to the weight of the entire ink composition. Furthermore, these surfactants may be contained singly, or in a combination of two or more types of polysiloxane compounds.

(G) Other Radically Polymerizable Compound

In the present invention, in addition to components (A) and (B), another radically polymerizable compound (hereinafter, also called simply a 'radically polymerizable compound', which needless to say means a radically polymerizable compound other than components (A) and (B)), may be contained.

It is preferable to use a radically polymerizable compound in combination since an ink composition having better curability can be provided.

Examples of the radically polymerizable compound include photocurable materials employing photopolymerizable compositions described in JP-A-7-159983, JP-B-7-31399, JP-A-8-224982, JP-A-10-863, JP-A-9-80675, etc.

The radically polymerizable compound is a compound having a radically polymerizable ethylenically unsaturated bond, and may be any compound as long as it has at least one radically polymerizable ethylenically unsaturated bond in the molecule; examples thereof include those having a chemical configuration such as a monomer, an oligomer, or a polymer. One type of radically polymerizable compound may be used, or two or more types thereof may be used at any ratio in combination in order to improve an intended property.

Preferred examples of polymerizable compounds having a radically polymerizable ethylenically unsaturated bond include unsaturated carboxylic acids such as acrylic acid, methacrylic acid, itaconic acid, crotonic acid, isocrotonic acid, and maleic acid, and salts thereof, anhydrides having an ethylenically unsaturated group, acrylonitrile, styrene, and various types of unsaturated polyesters, unsaturated polyethers, unsaturated polyamides, and (meth)acrylic acid esters of unsaturated urethane (meth)acrylic monomers or prepolymers, epoxy monomers or prepolymers, or urethane monomers or prepolymers.

Specific examples thereof that can be used include acrylic acid derivatives such as (poly)ethylene glycol mono(meth)acrylate, (poly)ethylene glycol (meth)acrylate methyl ester, (poly)ethylene glycol (meth)acrylate ethyl ester, (poly)ethylene glycol (meth)acrylate phenyl ester, (poly)propylene glycol mono(meth)acrylate, (poly)propylene glycol mono(meth)acrylate phenyl ester, (poly)propylene glycol (meth)acrylate methyl ester, (poly)propylene glycol (meth)acrylate ethyl ester, neopentyl glycol di(meth)acrylate, (poly)ethylene glycol di(meth)acrylate, (poly)tetramethylene glycol di(meth)acrylate, (poly)tetramethylene glycol di(meth)acrylate, bisphenol A propylene oxide(PO) adduct di(meth)acrylate, ethoxylated neopentyl glycol diacrylate, propoxylated neopentyl glycol diacrylate, bisphenol A ethylene oxide (EO) adduct di(meth)acrylate, EO-modified pentaerythritol triacrylate, PO-modified pentaerythritol triacrylate, EO-modified pentaerythritol tetraacrylate, PO-modified pentaerythritol tetraacrylate, EO-modified dipentaerythritol tetraacrylate, PO-modified dipentaerythritol tetraacrylate, EO-modified trimethylolpropane triacrylate, PO-modified trimethylolpropane triacrylate, EO-modified tetramethylolmethane tetraacrylate, PO-modified tetramethylolmethane tetraacrylate, 2-ethylhexyl acrylate, n-octyl acrylate, n-nonyl acrylate, n-decyl acrylate, isooctyl acrylate, n-lauryl acrylate, n-tridecyl acrylate, n-cetyl acrylate, n-stearyl acrylate, 2-hydroxyethyl acrylate, butoxyethyl acrylate, tetrahydrofurfuryl acrylate, benzyl acrylate, pentaerythritol triacrylate, pentaerythritol tetraacrylate, dipentaerythritol tetraacrylate, trimethylolpropane triacrylate, tetramethylolmethane tetraacrylate, oligoester acrylate, N-methylolacrylamide, diacetone acrylamide, and epoxy acrylate, methacrylic derivatives such as methyl methacrylate, n-butyl methacrylate, 2-ethylhexyl methacrylate, n-octyl methacrylate, n-nonyl methacrylate, n-decyl methacrylate, isooctyl methacrylate, n-lauryl methacrylate, n-tridecyl methacrylate, n-cetyl methacrylate, n-stearyl methacrylate, allyl methacrylate, glycidyl methacrylate, benzyl methacrylate, dimethylaminomethyl methacrylate, trimethylolethane trimethacrylate, trimethylolpropane trimethacrylate, and 2,2-bis(4-methacryloxypolyethoxyphenyl)propane, allyl compound derivatives such as allyl glycidyl ether, diallyl phthalate, and triallyl trimellitate, 1,6-hexanediol diacrylate, 1,9-nonanediol diacrylate, 1,10-decanediol diacrylate, 2-ethylhexyl-diglycol acrylate, 2-hydroxy-3-phenoxypropyl acrylate, 2-hydroxybutyl acrylate, hydroxypivalic acid neopentyl glycol diacrylate, 2-acryloyloxyethylphthalic acid, tetramethylolmethane triacrylate, 2-acryloyloxyethyl-2-hydroxyethylphthalic acid, dimethyloltricyclodecane diacrylate, ethoxylated phenyl acrylate, 2-acryloyloxyethylsuccinic acid, modified glycerol triacrylate, bisphenol A diglycidyl ether acrylic acid adduct, modified bisphenol A diacrylate, 2-acyloyloxyethylhexahydrophthalic acid, dipentaerythritol hexaacrylate, pentaerythritol triacrylate tolylene diisocyanate urethane prepolymer, lactone-modified flexible acrylate, butoxyethyl acrylate, pentaerythritol triacrylate hexamethylene diisocyanate urethane prepolymer, methoxydipropylene glycol acrylate, ditrimethylolpropane tetraacrylate, and pentaerythritol triacrylate hexamethylene diisocyanate urethane prepolymer and, more specifically, commercial products, radically polymerizable or crosslinking monomers, oligomers, and polymers known in the art such as those described in 'Kakyozai Handobukku' (Crosslinking Agent Handbook), Ed. S. Yamashita (Taiseisha, 1981); 'UV·EB Koka Handobukku (Genryou Hen)' (UV·EB Curing Handbook (Starting Materials) Ed. K. Kato (Kobunshi Kankoukai, 1985); 'UV·EB Koka Gijutsu no Oyo to Shijyo' (Application and Market of UV·EB Curing Technology', p. 79, Ed. Rad Tech (CMC, 1989); and E. Takiyama 'Poriesuteru Jushi Handobukku' (Polyester Resin Handbook), (The Nikkan Kogyo Shimbun Ltd., 1988).

Furthermore, as the radically polymerizable compound, a vinyl ether compound is preferably used. Examples of vinyl ether compounds that can suitably be used include di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, and trimethylolpropane trivinyl ether, and monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-O-propylene carbonate, dodecyl vinyl ether, diethylene glycol monovinyl ether, octadecyl vinyl ether, ethylene glycol monovinyl ether, triethylene glycol monovinyl ether, hydroxyethylmonovinyl ether, and hydroxynonylmonovinyl ether.

Among these vinyl ether compounds, divinyl ether compounds and trivinyl ether compounds are preferable from the viewpoint of curability, adhesion, and surface hardness, and divinyl ether compounds are particularly preferable. The vinyl ether compounds may be used singly or in a combination of two or more types as appropriate.

In the present invention, the monomers listed above as the above-mentioned polymerizable compounds have high reactivity, low viscosity, and excellent adhesion to a recording medium.

The content of said other radically polymerizable compound in the ink composition is preferably at least 1 wt % but no greater than 70 wt %, and more preferably at least 1 wt % but no greater than 60 wt %.

In the present invention, the radically polymerizable compound may be used in combination with an oligomer or a polymer. The oligomer referred to here means a compound having a molecular weight (a weight-average molecular weight for one having a molecular weight distribution) of 2,000 or greater, and the polymer referred to here means a compound having a molecular weight (a weight-average molecular weight for one having a molecular weight distribution) of 10,000 or greater. The oligomer and the polymer optionally have a radically polymerizable group. It is preferable for the oligomer and the polymer to have no more than 4 radically polymerizable groups per molecule (an average of no more than 4 over all the molecules contained for one having a molecular weight distribution) since an ink composition having excellent flexibility can be obtained. They can suitably be used from the viewpoint of adjusting the viscosity to a level most suitable for jetting the ink.

(H) Other Component

The ink composition of the present invention may comprise another component as necessary. Examples of the other component include a sensitizing dye, a cosensitizer, another polymerizable compound, another polymerization initiator, a UV absorber, an antioxidant, an antifading agent, a conductive salt, a solvent, a polymer compound, and a basic compound.

Sensitizing Dye

The ink composition of the present invention may contain a sensitizing dye in order to promote decomposition of the above-mentioned polymerization initiator by absorbing specific actinic radiation, in particular when used for inkjet recording. The sensitizing dye absorbs specific actinic radiation and attains an electronically excited state. The sensitizing dye in the electronically excited state causes actions such as electron transfer, energy transfer, or heat generation upon contact with the polymerization initiator. This causes the polymerization initiator to undergo a chemical change and decompose, thus forming a radical, an acid, or a base.

Preferred examples of the sensitizing dye include those that belong to compounds below and have an adsorption wavelength in the region of 350 nm to 450 nm.

Polynuclear aromatic compounds (e.g. pyrene, perylene, triphenylene), xanthenes (e.g. fluorescein, eosin, erythrosine, rhodamine B, rose bengal), cyanines (e.g. thiacarbocyanine, oxacarbocyanine), merocyanines (e.g. merocyanine, carbomerocyanine), thiazines (e.g. thionine, methylene blue, toluidine blue), acridines (e.g. acridine orange, chloroflavin, acriflavine), anthraquinones (e.g. anthraquinone), squaryliums (e.g. squarylium), and coumarins (e.g. 7-diethylamino-4-methylcoumarin).

Preferred examples of the sensitizing dye include compounds represented by Formulae (IX) to (XIII) below.

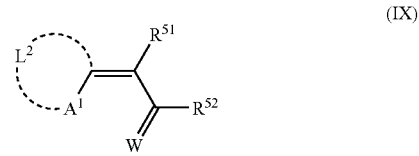
(IX)

In Formula (IX), $A^1$ denotes a sulfur atom or $NR^{50}$, $R^{50}$ denotes an alkyl group or an aryl group, $L^2$ denotes a non-metallic atomic group forming a basic nucleus of a dye in cooperation with a neighboring $A^1$ and the neighboring carbon atom, $R^{51}$ and $R^{52}$ independently denote a hydrogen atom or a monovalent non-metallic atomic group, and $R^{51}$ and $R^{52}$ may be bonded together to form an acidic nucleus of a dye. W denotes an oxygen atom or a sulfur atom.

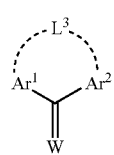
(X)

In Formula (X), $Ar^1$ and $Ar^2$ independently denote an aryl group and are connected to each other via a bond of $-L^3-$. Here, $L^3$ denotes —O— or —S—. W has the same meaning as that shown in Formula (IX).

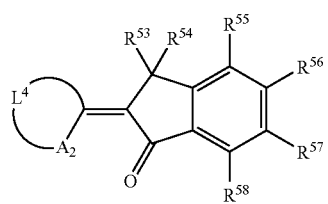
(XI)

In Formula (XI), $A_2$ denotes a sulfur atom or $NR^{59}$, $L^4$ denotes a non-metallic atomic group forming a basic nucleus of a dye in cooperation with the neighboring $A_2$ and carbon atom, $R^{53}$, $R^{54}$, $R^{55}$, $R^{56}$, $R^{57}$, and $R^{58}$ independently denote a monovalent non-metallic atomic group, and $R^{59}$ denotes an alkyl group or an aryl group.

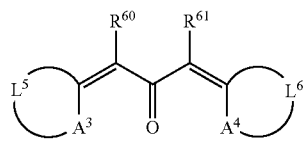
(XII)

In Formula (XII), $A^3$ and $A^4$ independently denote —S—, $-NR^{62}-$, or $-NR^{63}-$, $R^{62}$ and $R^{63}$ independently denote a substituted or unsubstituted alkyl group, or a substituted or unsubstituted aryl group, $L^5$ and $L^6$ independently denote a non-metallic atomic group forming a basic nucleus of a dye in cooperation with the neighboring $A^3$ and $A^4$ and neighboring carbon atom, and $R^{60}$ and $R^{61}$ independently denote a hydrogen atom or a monovalent non-metallic atomic group, or are bonded to each other to form an aliphatic or aromatic ring.

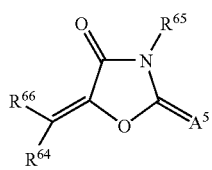
(XIII)

In Formula (XIII), $R^{66}$ denotes an aromatic ring or a hetero ring, which may have a substituent, and $A^5$ denotes an oxygen atom, a sulfur atom, or $-NR^{67}-$. $R^{64}$, $R^{65}$, and $R^{67}$ independently denote a hydrogen atom or a monovalent non-metallic atomic group, and $R^{67}$ and $R^{64}$, and $R^{65}$ and $R^{67}$ may be bonded to each other to form an aliphatic or aromatic ring.

Specific examples of the compounds represented by Formulae (IX) to (XIII) include (E-1) to (E-20) listed below.

In some of the compound examples below, the hydrocarbon chain is described by a simplified structural formula in which symbols for carbon (C) and hydrogen (H) are omitted.

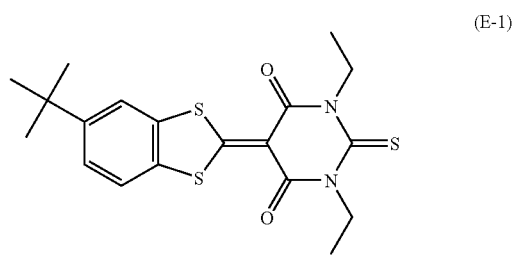
(E-1)

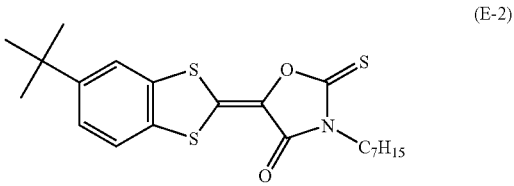
(E-2)

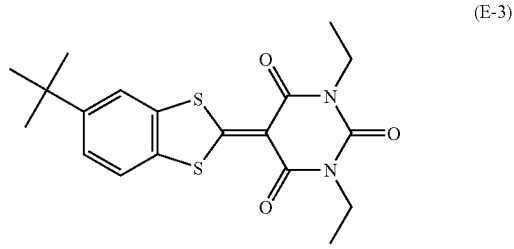
(E-3)

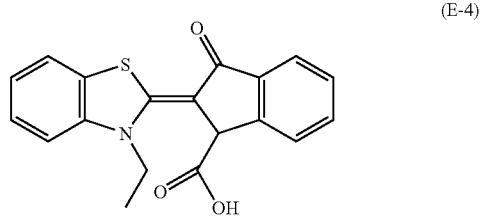
(E-4)

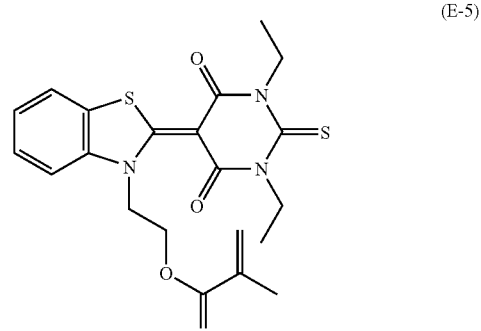
(E-5)

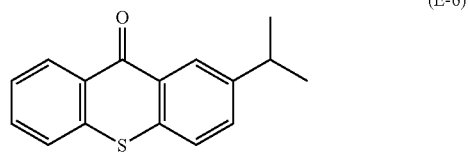
(E-6)

-continued

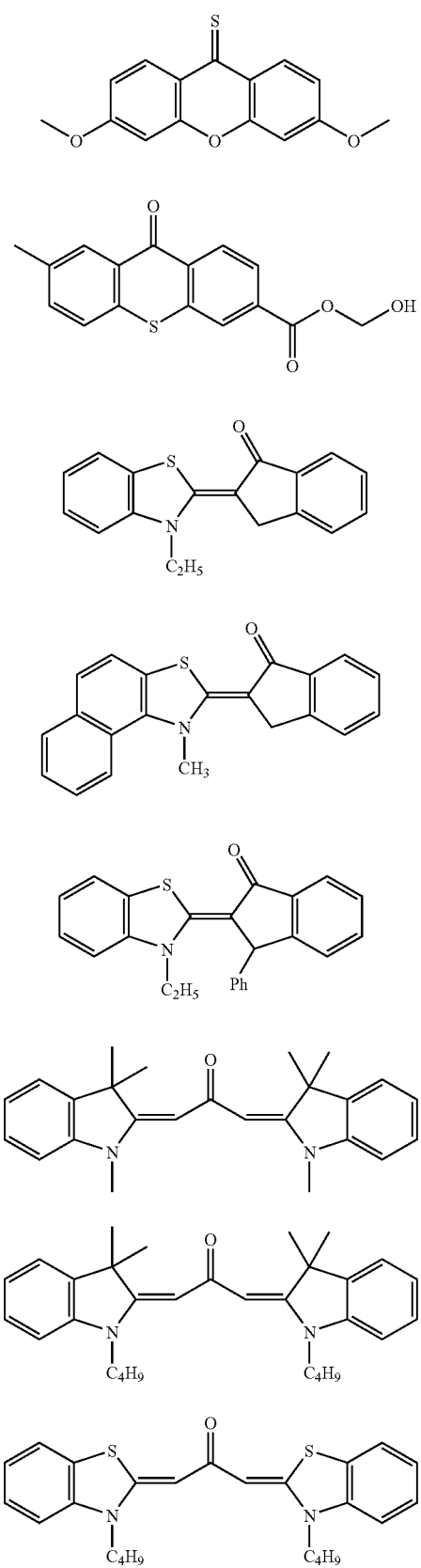
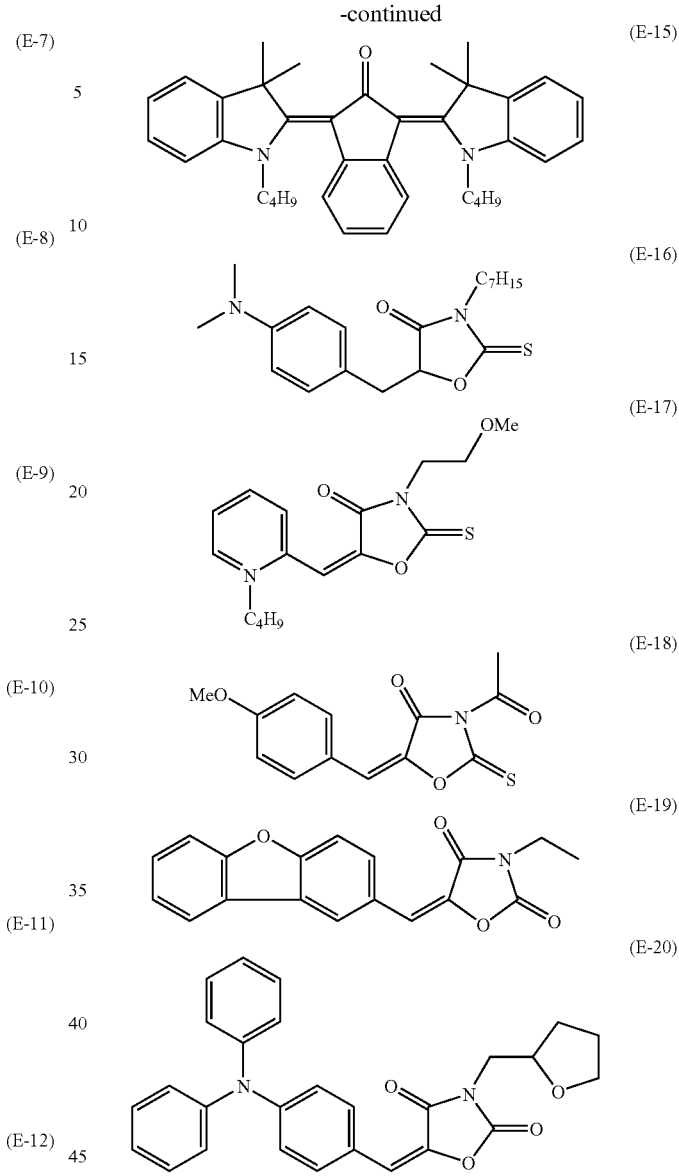

The content of the sensitizing colorant in the ink composition of the present invention is appropriately selected according to the intended purpose, but it is generally preferably 0.05 to 4 wt % relative to the weight of the entire ink composition.

Cosensitizer

The ink composition of the present invention preferably comprises a cosensitizer. In the present invention, the cosensitizer has the function of further improving the sensitivity of the sensitizing dye to actinic radiation or the function of suppressing inhibition by oxygen of polymerization of a polymerizable compound, etc.

Examples of such a cosensitizer include amines such as compounds described in M. R. Sander et al., 'Journal of Polymer Society', Vol. 10, p. 3173 (1972), JP-B-44-20189, JP-A-51-82102, JP-A-52-134692, JP-A-59-138205, JP-A-60-84305, JP-A-62-18537, JP-A-64-33104, and Research Disclosure No. 33825, and specific examples thereof include triethanolamine, ethyl p-dimethylaminobenzoate, p-formyldimethylaniline, and p-methylthiodimethylaniline.

Other examples of the cosensitizer include thiols and sulfides such as thiol compounds described in JP-A-53-702, JP-B-55-500806, and JP-A-5-142772, and disulfide compounds of JP-A-56-75643, and specific examples thereof include 2-mercaptobenzothiazole, 2-mercaptobenzoxazole, 2-mercaptobenzimidazole, 2-mercapto-4(3H)-quinazoline, and β-mercaptonaphthalene.

Yet other examples of the cosensitizer include amino acid compounds (e.g. N-phenylglycine, etc.), organometallic compounds described in JP-B-48-42965 (e.g. tributyltin acetate, etc.), hydrogen-donating compounds described in JP-B-55-34414, sulfur compounds described in JP-A-6-308727 (e.g. trithiane, etc.), and phosphorus compounds described in JP-A-6-250387 (diethylphosphite, etc.).

The content of the cosensitizer in the ink composition of the present invention is appropriately selected according to the intended purpose, but it is generally preferably 0.05 to 4 wt % relative to the weight of the entire ink composition.

Other Polymerizable Compound

The ink composition of the present invention may comprise in combination as necessary a cationic polymerizable compound as another polymerizable compound. When a cationic polymerizable compound is used in combination, it is preferable to use a cationic polymerization initiator in combination as a polymerization initiator.

The cationic polymerizable compound used in the present invention is not particularly limited as long as it is a compound that undergoes a polymerization reaction by virtue of an acid generated by the photo-acid generator and is cured, and various types of cationic polymerizable monomers known as photo-cationic polymerizable monomers may be used. Examples of the cationic polymerizable monomer include epoxy compounds, vinyl ether compounds, oxetane compounds described in JP-A-6-9714, JP-A-2001-31892, JP-A-2001-40068, JP-A-2001-55507, JP-A-2001-310938, JP-A-2001-310937, JP-A-2001-220526, etc.

As the cationic polymerizable compound, for example, a cationic polymerizable type photocuring resin is known, and in recent years cationic photopolymerizable type photocuring resins sensitized to a visible light wavelength region of 400 nm or longer have been disclosed in, for example, JP-A-6-43633 and JP-A-8-324137. They may also be applied to the ink composition of the present invention.

Other Polymerization Initiator

The ink composition of the present invention may comprise in combination as necessary a cationic polymerization initiator as another polymerization initiator. When a cationic polymerization initiator is used in combination, it is preferable to use a cationic polymerizable compound in combination as a polymerizable compound.

Firstly, $B(C_6F_5)_4^-$, $PF_6^-$, $AsF_6^-$, $SbF_6^-$, and $CF_3SO_3^-$ salts of diazonium, ammonium, iodonium, sulfonium, phosphonium, etc. aromatic onium compounds can be cited. Secondly, sulfonated materials that generate a sulfonic acid can be cited. Thirdly, halides that photogenerate a hydrogen halide can also be used. Fourthly, iron arene complexes can be cited.

Examples [(b-1) to (b-96)] of cationic polymerization initiators that are suitably used in the present invention are listed below, but the present invention should not be construed as being limited thereby. In some of the compound examples below, the hydrocarbon chain is described by a simplified structural formula in which symbols for carbon (C) and hydrogen (H) are omitted.

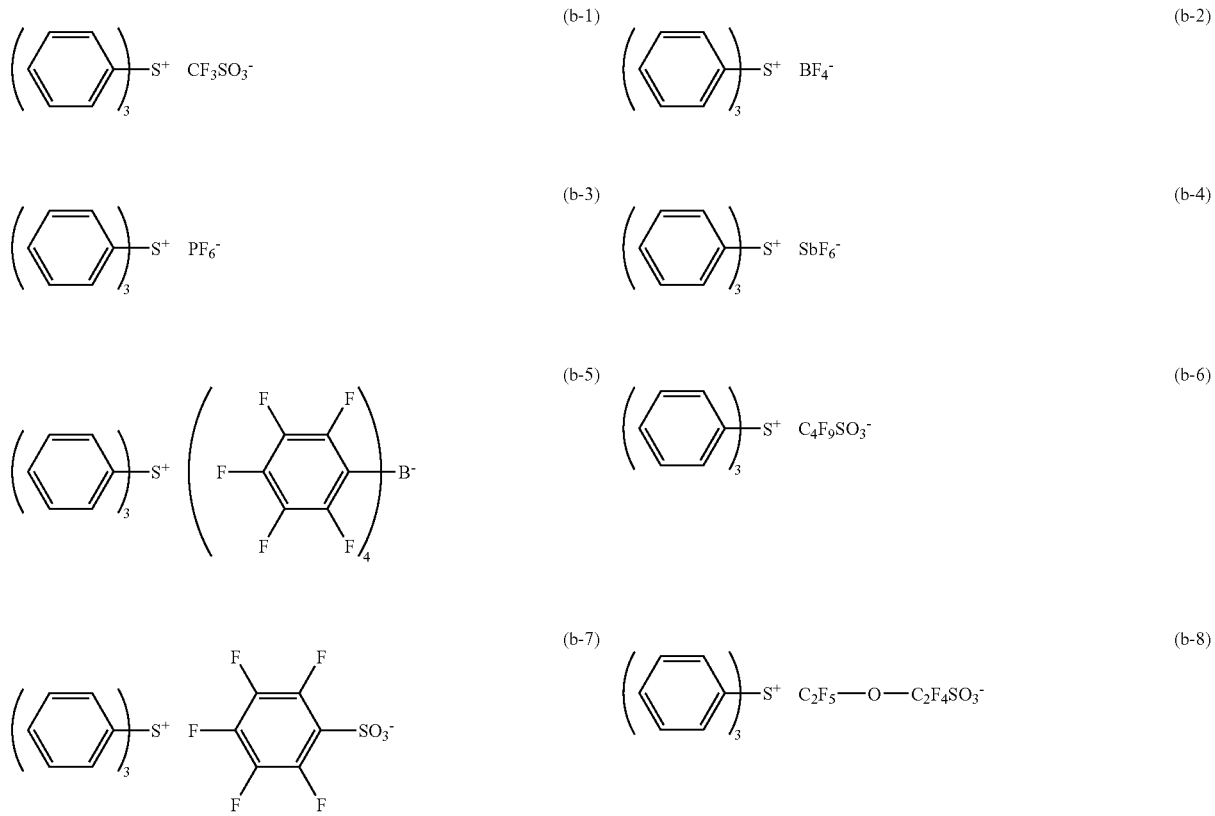

-continued
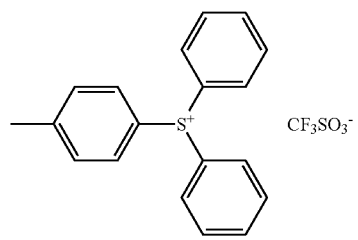 (b-9)
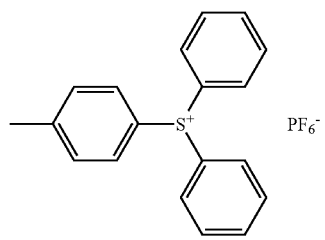 (b-10)
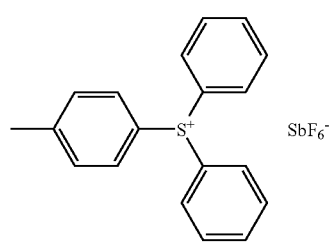 (b-11)
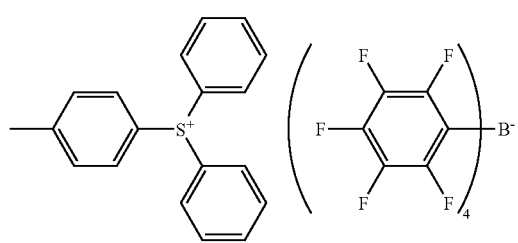 (b-12)
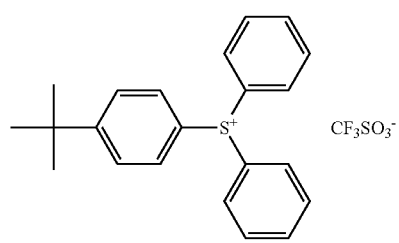 (b-13)
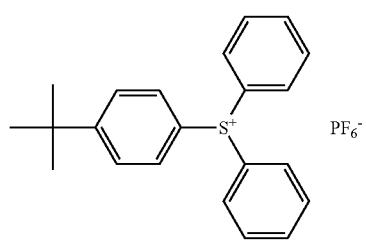 (b-14)
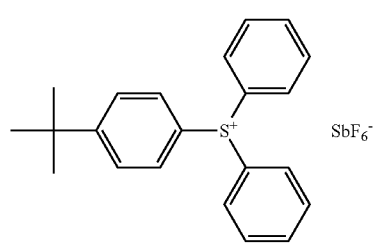 (b-15)
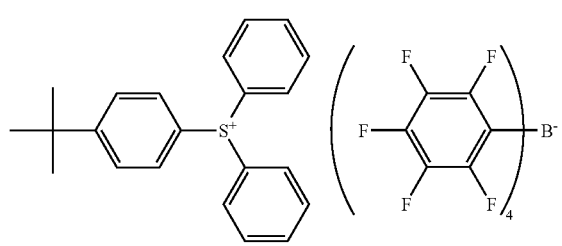 (b-16)
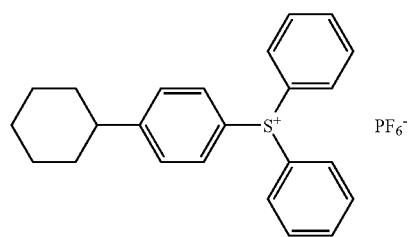 (b-17)
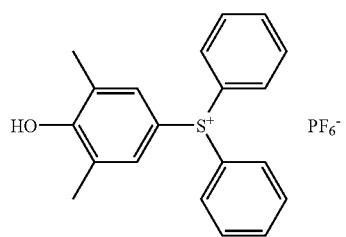 (b-18)
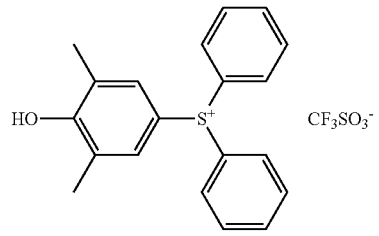 (b-19)
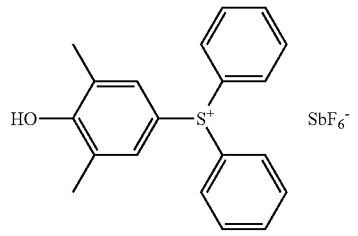 (b-20)

-continued
(b-21)
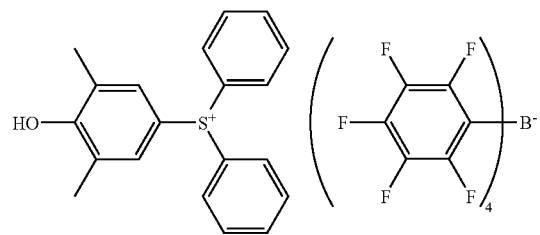
(b-22)
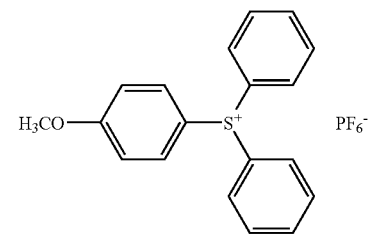
(b-23)
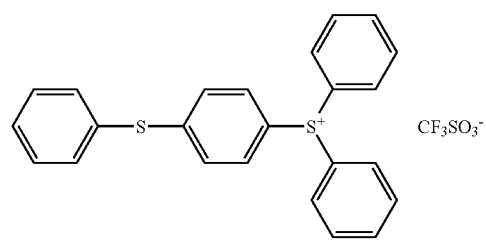
(b-24)
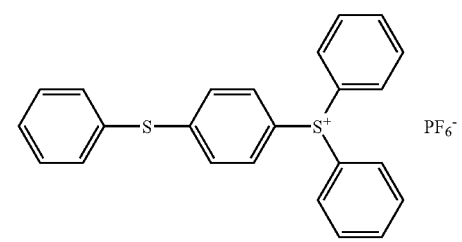
(b-25)
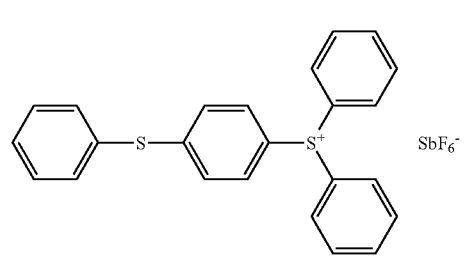
(b-26)
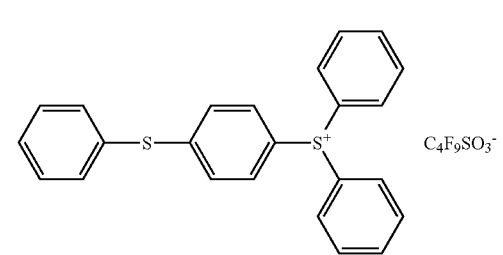
(b-27)
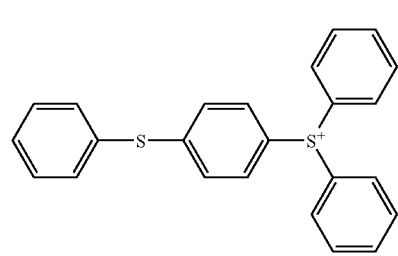
(b-28)
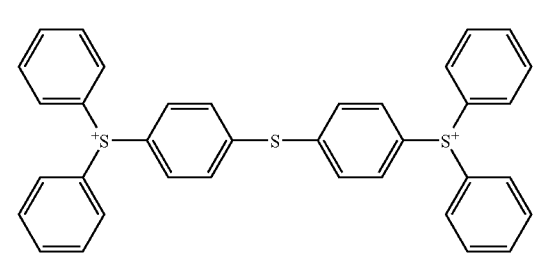
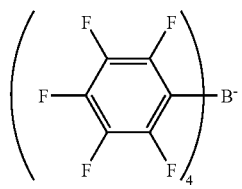
(b-29)
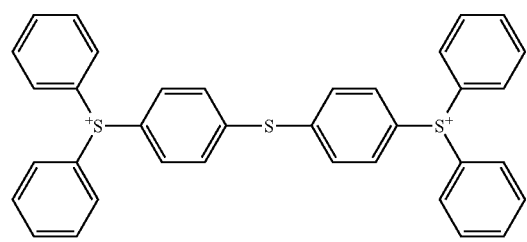
(b-30)
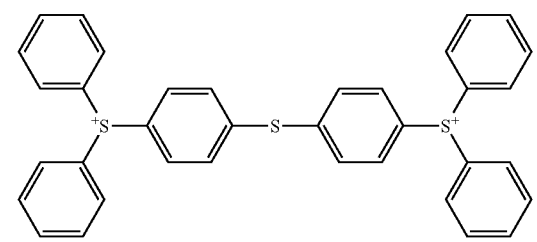

-continued
(b-31)
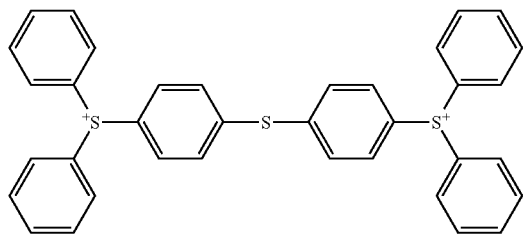
2C$_4$F$_9$SO$_3^-$
(b-32)
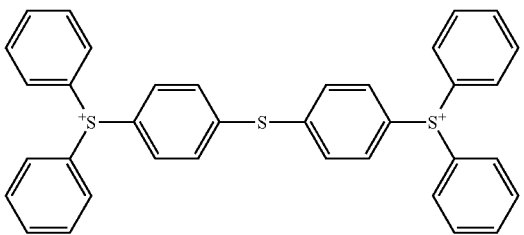
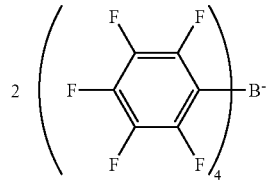
(b-33)
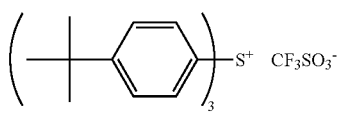 CF$_3$SO$_3^-$
(b-34)
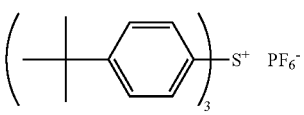 PF$_6^-$
(b-35)
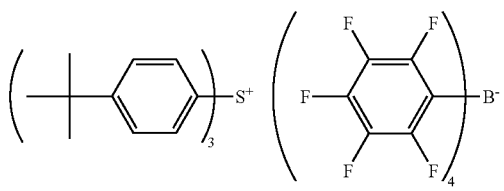
(b-36)
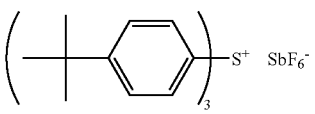 SbF$_6^-$
(b-37)
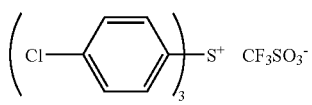 CF$_3$SO$_3^-$
(b-38)
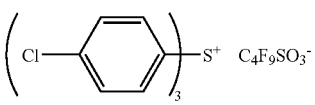 C$_4$F$_9$SO$_3^-$
(b-39)
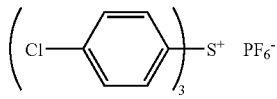 PF$_6^-$
(b-40)
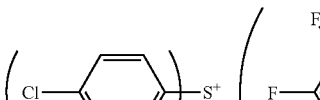
(b-41)
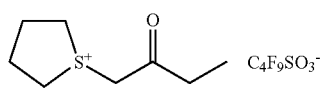 C$_4$F$_9$SO$_3^-$
(b-42)
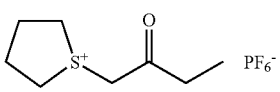 PF$_6^-$
(b-43)
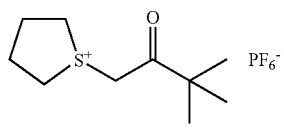 PF$_6^-$
(b-44)
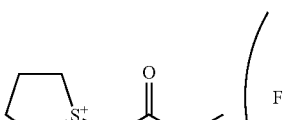
(b-45)
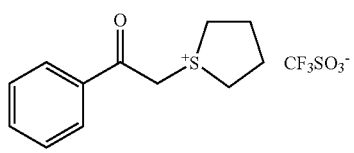 CF$_3$SO$_3^-$
(b-46)
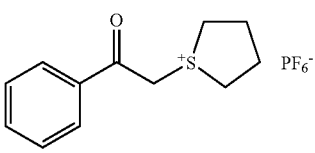 PF$_6^-$ -continued
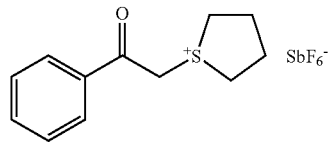 (b-47)
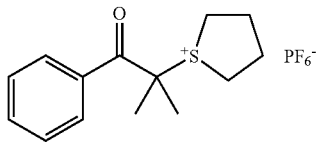 (b-48)
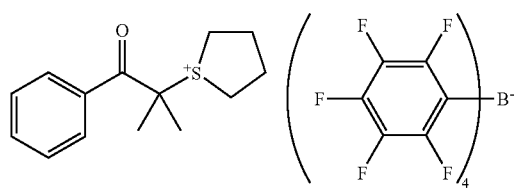 (b-49)
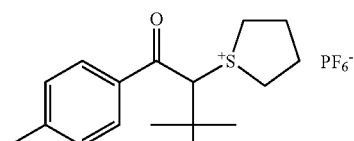 (b-50)
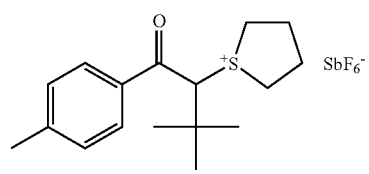 (b-51)
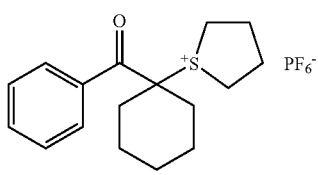 (b-52)
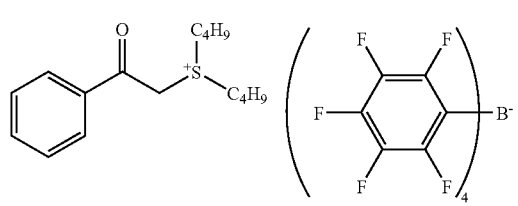 (b-53)
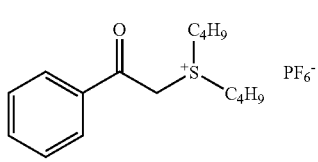 (b-54)
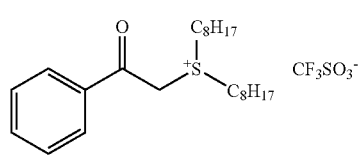 (b-55)
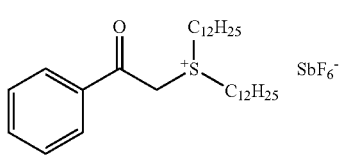 (b-56)
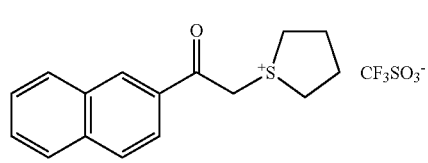 (b-57)
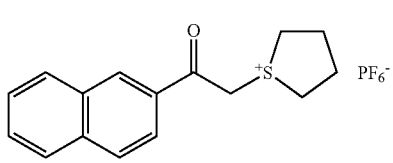 (b-58)
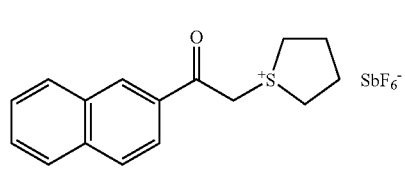 (b-59)
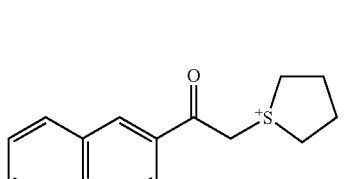 (b-60)
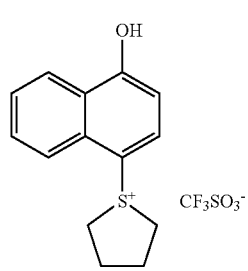 (b-61)
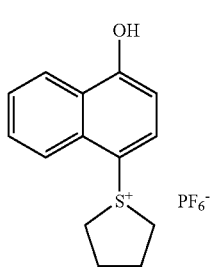 (b-62)

-continued

-continued
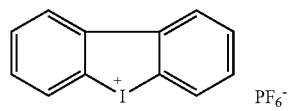 (b-81)
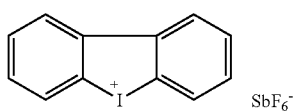 (b-82)
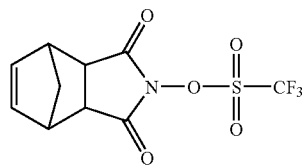 (b-83)
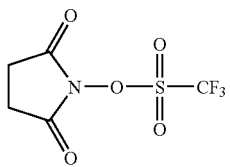 (b-84)
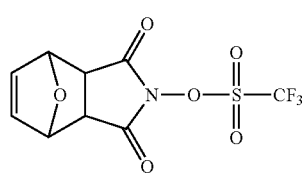 (b-85)
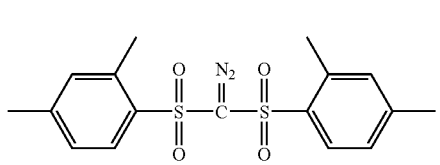 (b-86)
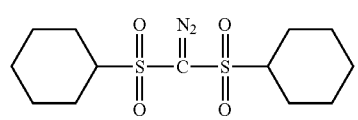 (b-87)
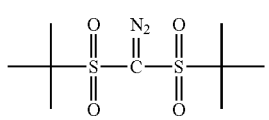 (b-88)
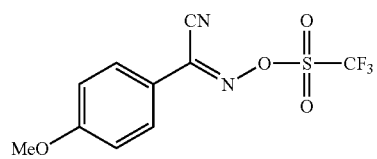 (b-89)
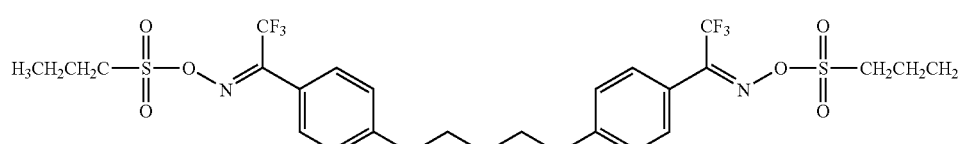 (b-90)
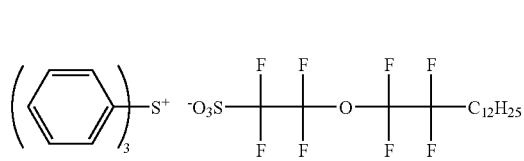 (b-91)
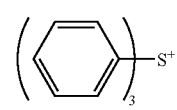 (b-92)
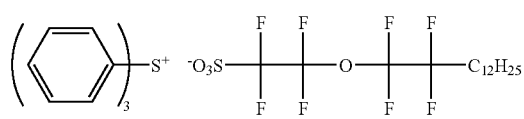
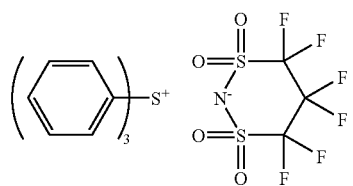 (b-93)
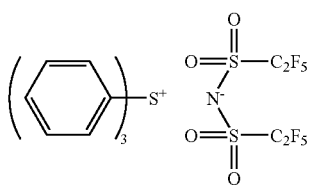 (b-94)

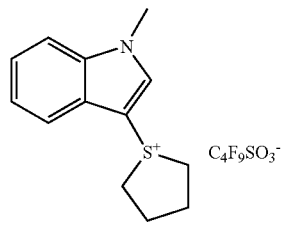

(b-95)

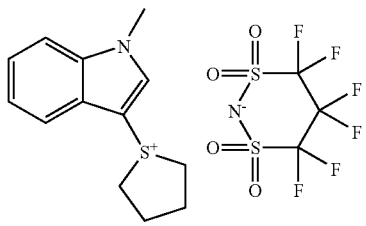

(b-96)

UV Absorber

A UV absorber may be used from the viewpoint of improving the weather resistance of an image obtained and preventing discoloration.

The UV absorbers include benzotriazole compounds described in JP-A-58-185677, JP-A-61-190537, JP-A-2-782, JP-A-5-197075 and JP-A-9-34057; benzophenone compounds described in JP-A-46-2784, JP-A-5-194483 and U.S. Pat. No. 3,214,463; cinnamic acid compounds described in JP-B-48-30492, JP-B-56-21141 and JP-A-10-88106; triazine compounds described in JP-A-4-298503, JP-A-8-53427, JP-A-8-239368, JP-A-10-182621 and JP-W-8-501291 (the term "JP-W" as used herein means an unexamined published international patent application); compounds described in Research Disclosure No. 24239; and compounds represented by stilbene and benzoxazole compounds, which absorb ultraviolet rays to emit fluorescence, the so-called fluorescent brightening agents.

The amount thereof added is appropriately selected according to the intended application, and it is generally on the order of 0.5 to 15 wt % on the basis of the solids content in the ink composition.

Antioxidant

In order to improve the stability of the ink composition, an antioxidant may be added. Examples of the antioxidant include those described in Laid-open European Patent Nos. 223739, 309401, 309402, 310551, 310552, and 459416, Laid-open German Patent No. 3435443, JP-A-54-48535, JP-A-62-262047, JP-A-63-113536, JP-A-63-163351, JP-A-2-262654, JP-A-2-71262, JP-A-3-121449, JP-A-5-61166, JP-A-5-119449, and U.S. Pat. Nos. 4,814,262 and 4,980,275.

The amount thereof added is appropriately selected according to the intended application, and it is preferably on the order of 0.1 to 8 wt % on the basis of the solids content in the ink composition.

Antifading Agent

The ink composition of the present invention may employ various organic and metal complex antifading agents. The organic antifading agents include hydroquinones, alkoxyphenols, dialkoxyphenols, phenols, anilines, amines, indanes, chromans, alkoxyanilines, and heterocycles, and the metal complex antifading agents include nickel complexes and zinc complexes. More specifically, there can be used compounds described in patents cited in Research Disclosure, No. 17643, Items VII-1 to J, ibid., No. 15162, ibid., No. 18716, page 650, left-hand column, ibid., No. 36544, page 527, ibid., No. 307105, page 872, and ibid., No. 15162, and compounds contained in general formulae and compound examples of typical compounds described in JP-A-62-21572, pages 127 to 137.

The amount thereof added is appropriately selected according to the intended application, and it is preferably on the order of 0.1 to 8 wt % on the basis of the solids content in the ink composition.

Conductive Salt

The ink composition of the present invention may contain, for the purpose of controlling discharge properties, a conductive salt such as potassium thiocyanate, lithium nitrate, ammonium thiocyanate, or dimethylamine hydrochloride.

Solvent

It is also effective to add a trace amount of organic solvent to the ink composition of the present invention in order to improve the adhesion to a recording medium.

The solvent used in the present invention, when using a resin as an inner construction of polymerization particles, has preferably 2 or greater solubility parameter (SP value) than that of the resin and more preferably 3 or greater.

Examples of the solvent include ketone-based solvents such as acetone, methyl ethyl ketone, and diethyl ketone, alcohol-based solvents such as methanol, ethanol, 2-propanol, 1-propanol, 1-butanol, and tert-butanol, chlorine-based solvents such as chloroform and methylene chloride, aromatic-based solvents such as benzene and toluene, ester-based solvents such as ethyl acetate, butyl acetate, and isopropyl acetate, ether-based solvents such as diethyl ether, tetrahydrofuran, and dioxane, and glycol ether-based solvents such as ethylene glycol monomethyl ether and ethylene glycol dimethyl ether.

In this case, it is effective if the amount thereof added is in a range that does not cause problems with the solvent resistance or the VOC, and the amount is preferably in the range of 0.1 to 5 wt % relative to the total amount of the ink composition, and more preferably 0.1 to 3 wt %.

High Molecular Weight Compound

The ink composition may contain various types of high molecular weight compounds in order to adjust film physical properties. Examples of the high molecular weight compounds include acrylic polymers, polyvinylbutyral resins, polyurethane resins, polyamide resins, polyester resins, epoxy resins, phenol resins, polycarbonate resins, polyvinylbutyral resins, polyvinylformal resins, shellac, vinylic resins, acrylic resins, rubber-based resins, waxes, and other natural resins. They may be used in a combination of two or more types. Among these, a vinylic copolymer obtained by copolymerization of an acrylic monomer is preferable. Furthermore, as a copolymer component of the high molecular weight compound, a copolymer containing as a structural unit a 'carboxyl group-containing monomer', an 'alkyl methacrylate ester', or an 'alkyl acrylate ester' may preferably be used.

Basic Compound

It is preferable to add the basic compound from the viewpoint of improving the storage stability of the ink composition. As the basic compound that can be used in the present invention, a known basic compound may be used and, for example, a basic inorganic compound such as an inorganic salt or a basic organic compound such as an amine is preferably used.

In addition to the above, the composition may contain as necessary, for example, a leveling additive, a matting agent, a wax for adjusting film physical properties, or a tackifier in order to improve the adhesion to a recording medium such as polyolefin or PET, the tackifier not inhibiting polymerization.

Specific examples of the tackifier include high molecular weight tacky polymers described on pp. 5 and 6 of JP-A-2001-49200 (e.g. a copolymer formed from an ester of (meth) acrylic acid and an alcohol having an alkyl group with 1 to 20 carbons, an ester of (meth)acrylic acid and an alicyclic alcohol having 3 to 14 carbons, or an ester of (meth)acrylic acid and an aromatic alcohol having 6 to 14 carbons), and a low molecular weight tackifying resin having a polymerizable unsaturated bond.

Properties of Ink Composition

In the present invention, the ink composition has a viscosity at 25° C. of no more than 40 mPa·s, preferably 5 to 40 mPa·s, and more preferably 7 to 30 mPa·s. Furthermore, the viscosity of the ink composition at the discharge temperature (preferably 25° C. to 80° C., and more preferably 25° C. to 50° C.) is preferably 3 to 15 mPa·s, and more preferably 3 to 13 mPa·s. With regard to the ink composition of the present invention, it is preferable that its component ratio is appropriately adjusted so that the viscosity is in the above-mentioned range. When the viscosity at room temperature is set to be high, even when a porous recording medium is used, penetration of the ink composition into the recording medium can be prevented, and uncured monomer can be reduced. Furthermore, ink spreading when ink droplets have landed can be suppressed, and as a result there is the advantage that the image quality is improved.

The surface tension of the ink composition of the present invention at 25° C. is preferably 20 to 35 mN/m, and yet more preferably 23 to 33 mN/m. When recording is carried out on various types of recording medium such as polyolefin, PET, coated paper, and uncoated paper, from the viewpoint of spread and penetration, it is preferably at least 20 mN/m, and from the viewpoint of wettability it is preferably not more than 35 mN/m.

(2) Inkjet Recording Method and Inkjet Recording Device

The ink composition of the present invention is used for inkjet recording.

The inkjet recording method of the present invention is a method for forming an image by discharging the ink composition of the present invention onto a recording medium (support, recording material, etc.) for inkjet recording and curing the ink by irradiating the ink composition so discharged onto the recording medium with actinic radiation.

More particularly, the inkjet recording method of the present invention comprises ($a^1$) a step of discharging the ink composition of the present invention onto a recording medium and ($b^1$) a step of curing the ink composition by irradiating the ink composition so discharged with actinic radiation, The inkjet recording method of the present invention comprises the steps ($a^1$) and ($b^1$) above and thus forms an image from the ink composition cured on the recording medium.

The step ($a^1$) of the inkjet recording method of the present invention may employ an inkjet recording device that will be described in detail below.

Inkjet Recording Device

An inkjet recording device used in the inkjet recording method of the present invention is not particularly limited, and any known inkjet recording device that can achieve an intended resolution may be used. That is, any known inkjet recording device, such as a commercial product, may be used in order to discharge an ink composition onto a recording medium in step ($a^1$) of the inkjet recording method of the present invention.

The inkjet recording device that can be used in the present invention is equipped with, for example, an ink supply system, a temperature sensor, and an actinic radiation source.

The ink supply comprises, for example, a main tank containing the ink composition of the present invention, a supply pipe, an ink supply tank immediately before an inkjet head, a filter, and a piezo system inkjet head. The piezo system inkjet head may be driven so as to discharge a multisize dot of preferably 1 to 100 pL, and more preferably 8 to 30 pL, at a resolution of preferably 320×320 to 4,000×4,000 dpi, more preferably 400×400 to 1,600×1,600 dpi, and yet more preferably 720×720 dpi. Here, dpi referred to in the present invention means the number of dots per 2.54 cm.

As described above, since it is desirable for the radiation curing type ink to be discharged at a constant temperature, a section from the ink supply tank to the inkjet head is thermally insulated and heated. A method of controlling temperature is not particularly limited, but it is preferable to provide, for example, temperature sensors at a plurality of pipe section positions, and control heating according to the ink flow rate and the temperature of the surroundings. The temperature sensors may be provided on the ink supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

When the ink composition or the inkjet recording ink composition of the present invention is discharged using the above mentioned inkjet recording device, the ink composition is preferably discharged after being heated to preferably 25° C. to 80° C., and more preferably 25° C. to 50° C., so as to reduce the viscosity of the ink composition to preferably 3 to 15 mPa·s, and more preferably 3 to 13 mPa·s. In particular, it is preferable to use the ink composition having an ink viscosity at 25° C. of no more than 50 mPa·s since a good discharge stability can be obtained. By employing this method, high discharge stability can be realized.

The radiation curing type ink composition such as the ink composition of the present invention generally has a viscosity that is higher than that of a normal ink composition or a water-based ink used for an inkjet recording ink, and variation in viscosity due to a change in temperature at the time of discharge is large. Viscosity variation in the ink has a large effect on changes in liquid droplet size and changes in liquid droplet discharge speed and, consequently, causes the image quality to be degraded. It is therefore necessary to maintain the ink discharge temperature as constant as possible. In the present invention, the control range for the temperature is desirably preferably ±5° C. of a set temperature, more preferably ±2° C. of the set temperature, and yet more preferably ±1° C. of the set temperature.

The step ($b^1$) of curing the discharged ink composition by irradiating the ink composition with actinic radiation is now explained.

The ink composition discharged onto the recording medium cures upon exposure to actinic radiation. This is due to an initiating species such as a radical, an acid, or a base being generated by decomposition of the polymerization initiator contained in the ink composition of the present invention by irradiation with actinic radiation, the initiating species functioning so as to make a polymerization reaction of a radically polymerizable compound take place and to promote it. In this process, if a sensitizing colorant is present together with the polymerization initiator in the ink composition, the sensitizing colorant in the system absorbs actinic radiation, becomes excited, and promotes decomposition of the polymerization initiator by contact with the polymerization initiator, thus enabling a curing reaction with higher sensitivity to be achieved.

The actinic radiation used in this process may include α rays, γ rays, an electron beam, X rays, UV rays, visible light, and IR rays. Although it depends on the absorption characteristics of the sensitizing dye, the peak wavelength of the actinic radiation is, for example, 200 to 600 nm, preferably 300 to 450 nm, and more preferably 350 to 420 nm.

Furthermore, in the present invention, the polymerization initiation system has sufficient sensitivity for low output actinic radiation. The actinic radiation is applied therefore so that the illumination intensity on the exposed surface is, for example, 10 to 4,000 mW/cm$^2$, and preferably 20 to 2,500 mW/cm$^2$.

As an actinic radiation source, a mercury lamp, a gas/solid laser, etc. are mainly used, and for UV photocuring inkjet a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Furthermore, light-emitting diodes (LED) and laser diodes (LD) may be used as the source of actinic radiation. In particular, when a UV ray source is needed, a UV-LED or a UV-LD may be used. For example, Nichia Corporation has marketed a violet LED having a wavelength of the main emission spectrum of between 365 nm and 420 nm. Furthermore, when a shorter wavelength is needed, U.S. Pat. No. 6,084,250 discloses an LED that can emit actinic radiation whose wavelength is centered between 300 nm and 370 nm. Furthermore, another violet LED is available, and irradiation can be carried out with radiation of a different UV bandwidth. The actinic radiation source particularly preferable in the present invention is a UV-LED, and a UV-LED having a peak wavelength at 350 to 420 nm is particularly preferable.

The maximum illumination intensity of the LED on a recording medium is preferably 10 to 2,000 mW/cm$^2$, more preferably 20 to 1,000 mW/cm$^2$, and particularly preferably 50 to 800 mJ/cm$^2$.

The ink composition of the present invention is desirably exposed to such actinic radiation for preferably 0.01 to 120 sec., and more preferably 0.1 to 90 sec.

Irradiation conditions and a basic method for irradiation with actinic radiation are disclosed in JP-A-60-132767. Specifically, a light source is provided on either side of a head unit that includes an ink discharge device, and the head unit and the light source are made to scan by a so-called shuttle system. Irradiation with actinic radiation is carried out after a certain time (preferably 0.01 to 0.5 sec., more preferably 0.01 to 0.3 sec., and yet more preferably 0.01 to 0.15 sec.) has elapsed from when the ink has landed. By controlling the time from ink landing to irradiation so as to be a minimum in this way, it becomes possible to prevent the ink that has landed on a recording medium from spreading before being cured. Furthermore, since the ink can be exposed before it reaches a deep area of a porous recording medium that the light source cannot reach, it is possible to prevent monomer from remaining unreacted, and as a result the odor can be reduced.

Furthermore, curing may be completed using another light source that is not driven. WO99/54415 discloses, as an irradiation method, a method employing an optical fiber and a method in which a collimated light source is incident on a mirror surface provided on a head unit side face, and a recorded area is irradiated with UV light.

By employing such a recording method, it is possible to maintain a uniform dot diameter for landed ink even for various types of recording media having different surface wettability, thereby improving the image quality. In order to obtain a color image, it is preferable to superimpose colors in order from those with a low lightness. By superimposing inks in order from one with low lightness, it is easy for radiation to reach a lower ink, the curing sensitivity is good, the amount of residual monomer decreases, and an improvement in adhesion can be expected. Furthermore, although it is possible to discharge all colors and then expose them at the same time, it is preferable to expose one color at a time from the viewpoint of promoting curing.

In this way, the ink composition of the present invention is cured by irradiation with actinic radiation in high sensitivity to thus form an image on the surface of the recording medium.

(3) Lithographic Printing Plate and Production Process

It is possible to produce a lithographic printing plate by applying the ink composition of the present invention to a hydrophilic support by the inkjet recording method of the present invention and curing it.

A process for producing a lithographic printing plate by employing the inkjet recording method of the present invention (the process for producing a lithographic printing plate of the present invention) and a lithographic printing plate obtained thereby (the lithographic printing plate of the present invention) are explained below.

The lithographic printing plate of the present invention comprises a hydrophilic support and a hydrophobic image formed on the hydrophilic support. This process for producing a lithographic printing plate comprises the following steps.

($a^2$) a step of discharging the ink composition of the present invention onto a hydrophilic support, and ($b^2$) a step of curing the ink composition by irradiating the discharged ink composition with actinic radiation so as to form a hydrophobic image on the hydrophilic support by curing the ink composition.

That is, a lithographic printing plate can be produced in the same manner as in the inkjet recording method of the present invention except that a support having a hydrophilic surface that is suitable as a lithographic printing plate support is used as a recording medium.

Conventionally, a lithographic printing plate has been produced by imagewise exposing to light a so-called PS plate having an arrangement in which a lipophilic photosensitive resin layer is provided on a hydrophilic support as described above so as to solubilize or cure the exposed area and form an image, followed by dissolving and removing a non-image area.

On the other hand, the lithographic printing plate of the present invention can be formed by employing the process for producing a lithographic printing plate of the present invention (the inkjet recording method of the present invention) so as to discharge an ink composition directly onto the surface of a hydrophilic support in accordance with digitized image information and cure it to form a hydrophobic image area. This enables a lithographic printing plate to be prepared more easily than by the conventional method.

Hydrophilic Support Used for Lithographic Printing Plate

The lithographic printing plate of the present invention comprises a hydrophilic support and an hydrophobic image formed by the ink composition of the present invention on the support.

The support for lithographic printing plate (recording medium) onto which the ink composition of the present invention is discharged is not particularly limited, and a dimensionally stable sheet-form support may be used. The support is preferably a hydrophilic support. It is preferable that a material forming the support has a hydrophilic surface from the view point of the image quality of the printed material thus obtained.

Examples of materials forming the support include paper, paper laminated with a plastic (e.g. polyethylene, polypropylene, polystyrene, etc.), a metal sheet (e.g. aluminum, zinc, copper, etc.), a plastic film (e.g. cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinyl acetal, etc.), and paper or plastic film on which the above-mentioned metal is laminated or vapor-deposited. Preferred examples of the support include a polyester film and aluminum sheet. Among these, aluminum sheet is particularly preferable since the dimensional stability is good and it is relatively inexpensive.

The aluminum sheet is a pure aluminum sheet, an alloy sheet containing aluminum as a main component and a small amount of a different element, or a thin film of aluminum or an aluminum alloy laminated with a plastic. Examples of the different element contained in the aluminum alloy include silicon, iron, manganese, copper, magnesium, chromium, zinc, bismuth, nickel, and titanium. The content of the different element in the alloy is preferably equal to or less than 10 wt %. In the present invention, a pure aluminum sheet is preferable, but since it is difficult to produce completely pure aluminum because of the refining technique, a trace amount of a different element may be contained. The composition of the aluminum sheet is not specified, and a known generally used material may be utilized as appropriate.

The support preferably has a thickness of 0.1 to 0.6 mm, and more preferably 0.15 to 0.4 mm.

Prior to the aluminum sheet being used, it is preferably subjected to a surface treatment such as a surface roughening treatment or an anodizing treatment. Surface treatment makes it easy to improve the hydrophilicity and ensure that there is good adhesion between an image recording layer and the support. Prior to the aluminum sheet being subjected to the surface roughening treatment, it may be subjected as desired to a degreasing treatment using a surfactant, an organic solvent, an aqueous alkaline solution, etc. in order to remove rolling oil on the surface.

The surface roughening treatment for the aluminum sheet surface may be carried out by various types of methods, and examples thereof include a mechanical surface roughening treatment, an electrochemical surface roughening treatment (a surface roughening treatment involving dissolving the surface electrochemically), and a chemical surface roughening treatment (a surface roughening treatment involving selectively dissolving the surface chemically).

As a method for the mechanical surface roughening treatment, a known method such as a ball grinding method, a brush grinding method, a blast grinding method, or a buff grinding method may be used. It is also possible to use a transfer method in which an irregular shape is transferred using a roller provided with irregularities in an aluminum rolling stage.

As a method for the electrochemical surface roughening treatment, for example, a method in which alternating current or direct current is applied in an electrolyte solution containing an acid such as hydrochloric acid or nitric acid can be cited. It is also possible to employ a method as described in JP-A-54-63902 in which a mixed acid is used.

The aluminum sheet subjected to a surface roughening treatment is subjected as necessary to an alkali etching treatment using an aqueous solution of potassium hydroxide, sodium hydroxide, etc.; furthermore, after neutralization, it may be subjected to an anodizing treatment as desired in order to improve the abrasion resistance.

As an electrolyte that may be used for the anodizing treatment of the aluminum sheet, various types of electrolytes that form a porous oxide film may be used. In general, sulfuric acid, hydrochloric acid, oxalic acid, chromic acid, or a mixed acid thereof may be used. The concentration of the electrolyte may be determined as appropriate according to the type of electrolyte.

Conditions for the anodizing treatment depend on the type of electrolyte used and cannot be specified, but in general the electrolyte solution concentration is 1 to 80 wt %, the solution temperature is 5° C. to 70° C., the current density is 5 to 60 $A/dm^2$, the voltage is 1 to 100V, and the electrolysis time is 10 sec. to 5 min. The amount of anodized film formed is preferably 1.0 to 5.0 $g/m^2$, and more preferably 1.5 to 4.0 $g/m^2$. It is preferable for it to be in this range since good plate life and good scratch resistance of a non-image area of a lithographic printing plate can be obtained.

As the support that can be used in the present invention, a substrate that has been subjected to the above-mentioned surface treatment and has an anodized film may be used as it is, but in order to further improve the adhesion to the hydrophobic image, and the hydrophilicity, the contamination resistance, etc., the substrate may appropriately be subjected as necessary to a treatment for enlarging micropores of the anodized film, a sealing treatment, or a surface hydrophilization treatment involving immersion in an aqueous solution containing a hydrophilic compound, which are described in JP-A-2001-253181 or JP-A-2001-322365. These enlarging and sealing treatments are not limited to those described therein, and any conventionally known methods may be employed.

Sealing Treatment

The sealing treatment may be vapor sealing, a treatment with an aqueous solution containing an inorganic fluorine compound such as a single treatment with fluorozirconic acid or a treatment with sodium fluoride, vapor sealing with added lithium chloride, or a sealing treatment with hot water.

Among these, the sealing treatment with an aqueous solution containing an inorganic fluorine compound, the sealing treatment with vapor, and the sealing treatment with hot water are preferable. Each thereof is explained below.

Sealing Treatment with Aqueous Solution Containing Inorganic Fluorine Compound

In the sealing treatment with an aqueous solution containing an inorganic fluorine compound, a metal fluoride can suitably be used as the inorganic fluorine compound.

Specific examples thereof include sodium fluoride, potassium fluoride, calcium fluoride, magnesium fluoride, sodium fluorozirconate, potassium fluorozirconate, sodium fluorotitanate, potassium fluorotitanate, ammonium fluorozirconate, ammonium fluorotitanate, potassium fluorotitanate, fluorozirconic acid, fluorotitanic acid, hexafluorosilicic acid, nickel fluoride, iron fluoride, fluorophosphoric acid, and ammonium fluorophosphate. Among them, sodium fluorozirconate, sodium fluorotitanate, fluorozirconic acid, and fluorotitanic acid are preferable.

The concentration of the inorganic fluorine compound in the aqueous solution is preferably at least 0.01 wt % from the viewpoint of sealing of micropores on an anodized coating being carried out sufficiently, and more preferably at least 0.05 wt %, and it is preferably no greater than 1 wt % from the viewpoint of contamination resistance, and more preferably no greater than 0.5 wt %.

The aqueous solution containing an inorganic fluorine compound preferably further contains a phosphate compound. It is preferable for a phosphate compound to be contained since the hydrophilicity of the surface of the anodized coating improves and the machine developability and the contamination resistance can be improved.

Preferred examples of the phosphate compound include phosphates of a metal such as an alkali metal or an alkaline earth metal.

Specific examples thereof include zinc phosphate, aluminum phosphate, ammonium phosphate, ammonium phosphate dibasic, ammonium dihydrogen phosphate, potassium dihydrogen phosphate, potassium phosphate dibasic, calcium phosphate, ammonium sodium hydrogen phosphate, magnesium hydrogen phosphate, magnesium phosphate, ferrous phosphate, ferric phosphate, sodium dihydrogen phosphate, sodium phosphate, sodium phosphate dibasic, lead phosphate, calcium dihydrogen phosphate, lithium phosphate, phosphotungstic acid, ammonium phosphotungstate, sodium phosphotungstate, ammonium phosphomolybdate, sodium phosphomolybdate, sodium phosphite, sodium tripolyphosphate, and sodium pyrophosphate. Among these, sodium dihydrogen phosphate, sodium phosphate dibasic, potassium dihydrogen phosphate, and potassium phosphate dibasic are preferable.

The combination of the inorganic fluorine compound and the phosphate compound is not particularly limited, but the aqueous solution preferably comprises at least sodium fluorozirconate as the inorganic fluorine compound and at least sodium dihydrogen phosphate as the phosphate compound.

The concentration of the phosphate compound in the aqueous solution is preferably at least 0.01 wt % from the viewpoint of improving machine developability and contamination resistance, and more preferably at least 0.1 wt %, and it is preferably no greater than 20 wt % from the viewpoint of solubility, and more preferably no greater than 5 wt %.

The proportion of each compound in the aqueous solution is not particularly limited, but the ratio by weight of the inorganic fluorine compound and the phosphate compound is preferably 1/200 to 10/1, and more preferably 1/30 to 2/1.

Furthermore, the temperature of the aqueous solution is preferably at least 20° C., and more preferably at least 40° C., and it is preferably no higher than 100° C., and more preferably no higher than 80° C.

Moreover, the pH of the aqueous solution is preferably at least 1, and more preferably at least 2, and it is preferably no greater than 11, and more preferably no greater than 5.

A method for the sealing treatment with the aqueous solution containing an inorganic fluorine compound is not particularly limited and, for example, an immersion method and a spray method may be used. They may be employed once or a plurality of times, or in a combination of two or more types.

Among these, the immersion method is preferable. When the treatment is carried out by the immersion method, the treatment time is preferably at least 1 sec., and more preferably at least 3 sec., and it is preferably no greater than 100 sec., and more preferably no greater than 20 sec.

Sealing Treatment with Steam

With regard to the sealing treatment with steam, for example, a method in which an anodized coating is contacted with steam at high pressure or normal pressure continuously or discontinuously can be cited.

The temperature of the steam is preferably at least 80° C., and more preferably at least 95° C., and it is preferably no greater than 105° C.

The pressure of the steam is preferably in the range of (atmospheric pressure−50 mmAq) to (atmospheric pressure+300 mmAq) ($1.008\times10^5$ to $1.043\times10^5$ Pa).

Furthermore, the time for which the coating is contacted with steam is preferably at least 1 sec., and more preferably at least 3 sec., and it is preferably no greater than 100 sec., and more preferably no greater than 20 sec.

Sealing Treatment with Hot Water

With regard to the sealing treatment with hot water, for example, a method in which an aluminum plate having an anodized coating formed thereon is immersed in hot water can be cited.

The hot water may contain an inorganic salt (e.g. a phosphate) or an organic salt.

The temperature of the hot water is preferably at least 80° C., and more preferably at least 95° C., and it is preferably no greater than 100° C.

Furthermore, the time for which immersion in hot water is carried out is preferably at least 1 sec., and more preferably at least 3 sec., and it is preferably no greater than 100 sec., and more preferably no greater than 20 sec.

With regard to a hydrophilization treatment that is used in the present invention, there is an alkali metal silicate method, as disclosed in U.S. Pat. Nos. 2,714,066, 3,181,461, 3,280,734, and 3,902,734. In this method, a support is immersed in an aqueous solution of sodium silicate, etc., or subjected to electrolysis. In addition, there is a method in which a support is treated with potassium fluorozirconate, as described in JP-B-36-22063, and a method in which a support is treated with polyvinylphosphonic acid, as described in U.S. Pat. Nos. 3,276,868, 4,153,461, and 4,689,272.

In the present invention, it is preferable for the support to have a center line average roughness of 0.10 to 1.2 μm. It is preferable for it to be in this range since good adhesion to a hydrophobic recording image, good plate life, and good contamination resistance can be obtained.

($a^2$) Step of Discharging the Ink Composition of the Present Invention onto Hydrophilic Support First, the ink composition of the present invention is discharged onto a hydrophilic support. This step may employ a conventionally known inkjet recording device in the same manner as in the above-mentioned inkjet recording method. Preferred ink temperature and viscosity when the ink is discharged using the inkjet recording device are the same as above and the control method therefor is also the same as above.

($b^2$) Step of Curing Ink Composition by Irradiating Discharged Ink Composition with Actinic Radiation so as to Form Hydrophobic Image by Curing Ink Composition The ink composition discharged onto the surface of a hydrophilic support is cured by irradiation with actinic radiation. Details of this curing mechanism are the same as those described for the inkjet recording method. Furthermore, the actinic radiation source used for curing the ink composition and irradiation conditions therefor are also the same as those described for the inkjet recording method.

Via the above-mentioned steps, a hydrophoblic image is formed on the surface of a hydrophilic support by curing the ink composition of the present invention, thus giving a lithographic printing plate.

In this way, by producing a lithographic printing plate by application of the inkjet recording method of the present invention, the diameter of dots of ink that has landed can be maintained at a constant size even for lithographic printing plate supports having different surface wettabilities and, as a result, a hydrophobic image can be formed with good precision.

Furthermore, as described above, the ink composition of the present invention can be cured by actinic radiation with high sensitivity, and a hydrophobic region (hydrophobic image) having excellent adhesion to a support and excellent film properties can be formed.

From the above, the lithographic printing plate of the present invention has high image quality and also has excellent plate life.

Needless to say, the ink composition of the present invention not only forms an image area of such a lithographic printing plate but is also useful as a normal ink composition.

In accordance with the present invention, it is possible to provide an ink composition that cures with high sensitivity in a short period of time upon exposure to actinic radiation and can form a high quality image, and an inkjet recording method, a printed material, and a process for producing a lithographic printing plate that employ the ink composition.

EXAMPLES

The present invention is explained in further detail by reference to Examples and Comparative Examples. However, the present invention should not be construed as being limited to these Examples.

'Parts' described below means 'parts by weight' unless otherwise specified.

Materials used in the present invention are as follows.
IRGALITE BLUE GLVO (cyan pigment, manufactured by Ciba Specialty Chemicals (CSC))
CINQUASIA MAGENTA RT-335 D (magenta pigment, manufactured by Ciba Specialty Chemicals)
NOVOPERM YELLOW H2G (yellow pigment, manufactured by Clariant)
SPECIAL BLACK 250 (black pigment, manufactured by Ciba Specialty Chemicals)
KRONOS 2300 (white pigment, manufactured by KRONOS)
Compound Example M-1 (1-adamantyl acrylate)
FANCRYL 512A (corresponding to compound example M-11, manufactured by Hitachi Chemical Co., Ltd.)
FANCRYL 513A (corresponding to compound example M-13, manufactured by Hitachi Chemical Co., Ltd.)
N-Vinylcaprolactam (NVC, manufactured by Aldrich)
Actilane 421 (propoxylated neopentyl glycol diacrylate, manufactured by Akcros)
KAYARAD DPCA-60 (DPCA, caprolactone-modified dipentaerythritol hexaacrylate, manufactured by Nippon Kayaku Co., Ltd.)
Solsperse 32000 (dispersant, manufactured by Noveon)
Disper BYK-168 (dispersant, manufactured by BYK Chemie)
NK ester AMP-10G (PEA, phenoxyethyl acrylate, manufactured by Shin-Nakamura Chemical Co., Ltd.)
THFA (tetrahydrofurfuryl acrylate, manufactured by Aldrich)
Rapi-Cure DVE-3 (triethylene glycol divinyl ether, manufactured by ISP Europe)
FIRSTCURE ST-1 (polymerization inhibitor, manufactured by ChemFirst)
Lucirin TPO (photopolymerization initiator, manufactured by BASF)
Benzophenone (photopolymerization initiator, manufactured by Wako Pure Chemical Industries, Ltd.)
IRGACURE 184 (photopolymerization initiator, manufactured by Ciba Specialty Chemicals)
BYK-307 (surfactant, manufactured by BYK Chemie)
KF-353 (silicone-based surfactant, manufactured by Shin-Etsu Chemical Co., Ltd.)
FIRSTCURE ITX (sensitizer, manufactured by ChemFirst)

Synthesis of Compound Example M-1

Compound example M-1 (1-adamantyl acrylate) was obtained by a reaction between 1-adamantyl alcohol and acryloyl chloride.

Preparation of Cyan Mill Base A 300 parts by weight of IRGALITE BLUE GLVO, 500 parts by weight of Actilane 421 (acrylate monomer manufactured by Akcros), and 200 parts by weight of Solsperse 32000 were mixed by stirring to give a pigment ink. Preparation of a Pigment Mill Base was Carried Out by Putting the Pigment Ink into an M50 disperser motor mill (manufactured by Eiger) and using zirconia beads having a diameter of 0.65 mm at a peripheral speed of 9 m/s for 4 hours.

Preparation of Magenta Mill Base B 300 parts by weight of CINQUASIA MAGENTA RT-335 D, 300 parts by weight of Rapi-Cure DVE-3, and 400 parts by weight of Solsperse 32000 were mixed by stirring to give a pigment ink. Preparation of a pigment mill base was carried out by putting the pigment ink into an M50 disperser motor mill (manufactured by Eiger) and using zirconia beads having a diameter of 0.65 mm at a peripheral speed of 9 m/s for 10 hours.

Preparation of Yellow Mill Base C 300 parts by weight of NOVOPERM YELLOW H2G, 300 parts by weight of Actilane 421 (acrylate monomer manufactured by Akcros), and 400 parts by weight of Solsperse 32000 were mixed by stirring to give a pigment ink. Preparation of a Pigment Mill Base was Carried Out by Putting the Pigment Ink into an M50 disperser motor mill (manufactured by Eiger) and using zirconia beads having a diameter of 0.65 mm at a peripheral speed of 9 m/s for 10 hours.

Preparation of Black Mill Base D 300 parts by weight of SPECIAL BLACK 250, 300 parts by weight of Actilane 421 (acrylate monomer manufactured by Akcros), and 400 parts by weight of Solsperse 32000 were mixed by stirring to give a pigment ink. Preparation of a Pigment Mill Base was Carried Out by Putting the Pigment Ink into an M50 disperser motor mill (manufactured by Eiger) and using zirconia beads having a diameter of 0.65 mm at a peripheral speed of 9 m/s for 7 hours.

Preparation of White Mill Base E 500 parts by weight of KRONOS 2300, 400 parts by weight of Actilane 421 (acrylate monomer manufactured by Akcros), and 100 parts by weight of Solsperse 32000 were mixed by stirring to give a pigment ink. Preparation of a pigment mill base was carried out by putting the pigment ink into an M50 disperser motor mill (manufactured by Eiger) and using zirconia beads having a diameter of 0.65 mm at a peripheral speed of 9 m/s for 4 hours.

Preparation of Cyan Mill Base A-2

300 parts by weight of IRGALITE BLUE GLVO, 650 parts by weight of NK ester AMP-10G, and 50 parts by weight of Solsperse 32000 were mixed by stirring to give a pigment ink. Preparation of a pigment mill base was carried out by putting the pigment ink into an M50 disperser motor mill (manufactured by Eiger) and using zirconia beads having a diameter of 0.65 mm at a peripheral speed of 9 m/s for 2 hours.

Preparation of Magenta Mill Base B-2

300 parts by weight of CINQUASIA MAGENTA RT-335 D, 640 parts by weight of NK ester AMP-10G, and 60 parts by weight of Solsperse 32000 were mixed by stirring to give a pigment ink. Preparation of a pigment mill base was carried out by putting the pigment ink into an M50 disperser motor mill (manufactured by Eiger) and using zirconia beads having a diameter of 0.65 mm at a peripheral speed of 9 m/s for 7 hours.

Preparation of Yellow Mill Base C-2

300 parts by weight of NOVOPERM YELLOW H2G, 640 parts by weight of NK ester AMP-10G, and 60 parts by weight of Solsperse 32000 were mixed by stirring to give a pigment ink. Preparation of a pigment mill base was carried out by putting the pigment ink into an M50 disperser motor mill (manufactured by Eiger) and using zirconia beads having a diameter of 0.65 mm at a peripheral speed of 9 m/s for 5 hours.

Preparation of Black Mill Base D-2

300 parts by weight of SPECIAL BLACK 250, 650 parts by weight of NK ester AMP-10G, and 50 parts by weight of Solsperse 32000 were mixed by stirring to give a pigment ink. Preparation of a pigment mill base was carried out by putting the pigment ink into an M50 disperser motor mill (manufactured by Eiger) and using zirconia beads having a diameter of 0.65 mm at a peripheral speed of 9 m/s for 3 hours.

Inkjet Image Recording Method

Subsequently, recording was carried out on a recording medium using an experimental inkjet recording device having a piezo system inkjet nozzle. The ink supply system comprised a main tank, a supply pipe, an ink supply tank immediately before an inkjet head, a filter, and a piezo system inkjet head, and a section from the ink supply tank to the inkjet head was thermally insulated and heated. Temperature sensors were provided on the ink supply tank and in the vicinity of the nozzle of the inkjet head, and the temperature was controlled so that the nozzle section was always at 45° C.±2° C. The piezo system inkjet head was driven so as to discharge multisize dots of 8 to 30 pL at a resolution of 720×720 dpi. The exposure system, the main scanning speed, and the discharge frequency were adjusted so that, after landing, UV light was focused to give an exposure area illumination intensity of 1,630 mW/cm$^2$, and irradiation started 0.1 sec. after the ink landed on the recording medium. The cumulative amount of light applied to an image was adjusted so as to be 1,500 mJ/cm$^2$. The UV lamp employed a HAN250NL high-cure mercury lamp (manufactured by GS Yuasa Corporation). Here, dpi referred to in the present invention denotes the number of dots per 2.54 cm. The recording medium employed an E5000 ester film (film thickness 125 μm, manufactured by Toyobo Co., Ltd.).

Method for Measuring Curing Sensitivity

In accordance with the above-mentioned inkjet recording method, a solid printed image having an average film thickness of 12 μm was formed, and the stickiness of the image was evaluated by touch after the image was irradiated with ultraviolet rays.

The curing sensitivity was evaluated using the following criteria.

3: No stickiness on image.
2: Image was slightly sticky.
1: Not hardened, to the extent that uncured ink was transferred to the hand.

Flexibility Evaluation Method: Bending Test

In the examples, as a method for evaluating the flexibility of a cured film, a bending test was carried out.

In accordance with the above-mentioned inkjet image recording method, an E5000 ester film (film thickness 125 μm, manufactured by Toyobo Co., Ltd.) was used as a recording medium, and three solid printed images having an average image area film thickness of 12 μm, 24 μm, and 36 μm were formed. The bending test involved bending once at 25° C. the recording medium on which an image had been formed, and an evaluation was carried out of the presence or absence of cracks in the image area. In general, when the average film thickness is large, the strain occurring in the image area when bending the image area becomes large, and cracks easily occur. That is, testing whether or not cracks occur in an image area having a larger film thickness gives a measure of the flexibility.

The evaluation criteria were as follows.

4: No cracks at all occurred in the bent portion of an image area for any of the samples having an average film thickness of 12 μm, 24 μm, and 36 μm.
3: No cracks occurred for samples having an average film thickness of 12 μm and 24 μm, but cracks occurred in the bent portion of an image area of a sample having an average film thickness of 36 μm.
2: No cracks occurred for a sample having an average film thickness of 12 μm, but cracks occurred in the bent portion of an image area of samples having an average film thickness of 24 μm and 36 μm.
1: Cracks occurred in the bent portion of an image area for all the samples having an average film thickness of 12 μm, 24 μm, and 36 μm.

Viscosity Measurement Method

Measurement of viscosity in the examples was carried out using a Brookfield LVDV-1 type B viscometer (manufactured by Brookfield) at 25° C. with a rotor rotational speed of 20 rpm.

Example 1

The components below were stirred using a high-speed water-cooled stirrer to give a cyan UV inkjet ink. The viscosity was 17 mPa·s.

Cyan Ink Composition

| | |
|---|---|
| (D) (E) Cyan mill base A | 6.0 parts |
| (A) N-Vinylcaprolactam | 25.0 parts |
| (B) FANCRYL 512A | 35.4 parts |
| NK ester AMP-10G | 20.0 parts |
| FIRSTCURE ST-1 | 0.05 parts |
| (C) Lucirin TPO (photoinitiator manufactured by BASF) | 8.5 parts |
| (C) Benzophenone (photoinitiator) | 3.0 parts |
| (C) IRGACURE 184 (photoinitiator manufactured by CSC) | 2.0 parts |
| (F) BYK-307 (surfactant manufactured by BYK Chemie) | 0.05 parts |

Evaluation of Ink

Inkjet recording was carried out using the ink composition thus obtained. The results of evaluation of the curability are given in Table 1.

Example 2

The components below were stirred using a high-speed water-cooled stirrer to give a magenta UV inkjet ink. The viscosity was 19 mPa·s.

Magenta Ink Composition

| | |
|---|---|
| (D) (E) Magenta mill base B | 12.0 parts |
| (A) N-Vinylcaprolactam | 25.0 parts |
| (B) FANCRYL 512A | 35.4 parts |
| NK ester AMP-10G | 14.0 parts |
| FIRSTCURE ST-1 | 0.05 parts |
| (C) Lucirin TPO (photoinitiator manufactured by BASF) | 8.5 parts |
| (C) Benzophenone (photoinitiator) | 3.0 parts |
| (C) IRGACURE 184 (photoinitiator manufactured by CSC) | 2.0 parts |
| (F) BYK-307 (surfactant manufactured by BYK Chemie) | 0.05 parts |

Evaluation of Ink

Inkjet recording was carried out using the ink composition thus obtained. The results of evaluation of the curability are given in Table 1.

Example 3

The components below were stirred using a high-speed water-cooled stirrer to give a yellow UV inkjet ink. The viscosity was 19 mPa·s.

Yellow Ink Composition

| | |
|---|---|
| (D) (E) Yellow mill base C | 12.0 parts |
| (A) N-Vinylcaprolactam | 25.0 parts |
| (B) FANCRYL 512A | 35.4 parts |
| NK ester AMP-10G | 14.0 parts |
| FIRSTCURE ST-1 | 0.05 parts |
| (C) Lucirin TPO (photoinitiator manufactured by BASF) | 8.5 parts |
| (C) Benzophenone (photoinitiator) | 3.0 parts |
| (C) IRGACURE 184 (photoinitiator manufactured by CSC) | 2.0 parts |
| (F) BYK-307 (surfactant manufactured by BYK Chemie) | 0.05 parts |

Evaluation of Ink

Inkjet recording was carried out using the ink composition thus obtained. The results of evaluation of the curability are given in Table 1.

Example 4

The components below were stirred using a high-speed water-cooled stirrer to give a black UV inkjet ink. The viscosity was 17 mPa·s.

Black Ink Composition

| | |
|---|---|
| (D) (E) Black mill base D | 6.0 parts |
| (A) N-Vinylcaprolactam | 25.0 parts |
| (B) FANCRYL 512A | 35.4 parts |
| NK ester AMP-10G | 20.0 parts |
| FIRSTCURE ST-1 | 0.05 parts |
| (C) Lucirin TPO (photoinitiator manufactured by BASF) | 8.5 parts |
| (C) Benzophenone (photoinitiator) | 3.0 parts |
| (C) IRGACURE 184 (photoinitiator manufactured by CSC) | 2.0 parts |
| (F) BYK-307 (surfactant manufactured by BYK Chemie) | 0.05 parts |

Evaluation of Ink

Inkjet recording was carried out using the ink composition thus obtained. The results of evaluation of the curability are given in Table 1.

Example 5

The components below were stirred using a high-speed water-cooled stirrer to give a cyan UV inkjet ink. The viscosity was 18 mPa·s.

Cyan Ink Composition

| | |
|---|---|
| (D) (E) Cyan mill base A-2 | 6.0 parts |
| (E) Disper BYK168 | 2.0 parts |
| (A) N-Vinylcaprolactam | 26.0 parts |
| (B) FANCRYL 512A | 36.5 parts |
| NK ester AMP-10G | 9.5 parts |
| KAYARAD DPCA-60 | 2.0 parts |
| Rapi-Cure DVE-3 | 3.0 parts |
| FIRSTCURE ST-1 | 0.3 parts |
| (C) Lucirin TPO (photoinitiator manufactured by BASF) | 9.0 parts |
| (C) Benzophenone (photoinitiator) | 3.2 parts |
| (C) IRGACURE 184 (photoinitiator manufactured by CSC) | 2.44 parts |
| (F) KF-353 | 0.06 parts |

Evaluation of Ink

Inkjet recording was carried out using the ink composition thus obtained. The results of evaluation of the curability are given in Table 1.

Example 6

The components below were stirred using a high-speed water-cooled stirrer to give a magenta UV inkjet ink. The viscosity was 20 mPa·s.

Magenta Ink Composition

| | |
|---|---|
| (D) (E) Magenta mill base B-2 | 13.0 parts |
| (E) Disper BYK168 | 2.0 parts |
| (A) N-Vinylcaprolactam | 22.0 parts |
| (B) FANCRYL 512A | 32.0 parts |
| NK ester AMP-10G | 8.0 parts |
| KAYARAD DPCA-60 | 1.4 parts |
| Rapi-Cure DVE-3 | 3.0 parts |
| FIRSTCURE ST-1 | 0.3 parts |
| (C) Lucirin TPO | 9.0 parts |
| (C) Benzophenone | 3.2 parts |
| (C) FIRSTCURE ITX | 6.04 parts |
| (F) KF-353 | 0.06 parts |

Evaluation of Ink

Inkjet recording was carried out using the ink composition thus obtained. The results of evaluation of the curability are given in Table 1.

Example 7

The components below were stirred using a high-speed water-cooled stirrer to give a yellow UV inkjet ink. The viscosity was 20 mPa·s.

Yellow Ink Composition

| | | |
|---|---|---|
| (D) (E) Yellow mill base C-2 | 13.0 | parts |
| (E) Disper BYK168 | 2.0 | parts |
| (A) N-Vinylcaprolactam | 24.0 | parts |
| (B) FANCRYL 512A | 35.0 | parts |
| NK ester AMP-10G | 9.0 | parts |
| KAYARAD DPCA-60 | 1.44 | parts |
| Rapi-Cure DVE-3 | 3.0 | parts |
| FIRSTCURE ST-1 | 0.3 | parts |
| (C) Lucirin TPO | 9.0 | parts |
| (C) Benzophenone | 3.2 | parts |
| (F) KF-353 | 0.06 | parts |

Evaluation of Ink

Inkjet recording was carried out using the ink composition thus obtained. The results of evaluation of the curability are given in Table 1.

Example 8

The components below were stirred using a high-speed water-cooled stirrer to give a black UV inkjet ink. The viscosity was 18 mPa·s.

Black Ink Composition

| | | |
|---|---|---|
| (D) (E) Black mill base D-2 | 6.0 | parts |
| (E) Disper BYK168 | 2.0 | parts |
| (A) N-Vinylcaprolactam | 26.0 | parts |
| (B) FANCRYL 512A | 36.5 | parts |
| NK ester AMP-10G | 9.5 | parts |
| KAYARAD DPCA-60 | 2.0 | parts |
| Rapi-Cure DVE-3 | 3.0 | parts |
| FIRSTCURE ST-1 | 0.3 | parts |
| (C) Lucirin TPO (photoinitiator manufactured by BASF) | 9.0 | parts |
| (C) Benzophenone (photoinitiator) | 3.2 | parts |
| (C) IRGACURE 184 (photoinitiator manufactured by CSC) | 2.44 | parts |
| (F) KF-353 | 0.06 | parts |

Evaluation of Ink

Inkjet recording was carried out using the ink composition thus obtained. The results of evaluation of the curability are given in Table 1.

Example 9

The components below were stirred using a high-speed water-cooled stirrer to give a white UV inkjet ink. The viscosity was 24 mPa·s.

White Ink Composition

| | | |
|---|---|---|
| (D) (E) White mill base E | 31.0 | parts |
| (A) N-Vinylcaprolactam | 18.0 | parts |
| (B) FANCRYL 512A | 26.4 | parts |
| NK ester AMP-10G | 10.0 | parts |
| FIRSTCURE ST-1 | 0.05 | parts |
| (C) Lucirin TPO (photoinitiator manufactured by BASF) | 8.5 | parts |
| (C) Benzophenone (photoinitiator) | 3.0 | parts |
| (C) IRGACURE 184 (photoinitiator manufactured by CSC) | 2.0 | parts |
| (F) BYK-307 (surfactant manufactured by BYK Chemie) | 0.05 | parts |
| FIRSTCURE ITX | 1.0 | parts |

Evaluation of Ink

Inkjet recording was carried out using the ink composition thus obtained. An image having a film thickness of 12 μm could be printed. The results of evaluation of the curability and flexibility of the cured film are given in Table 1.

Example 10

The components below were stirred using a high-speed water-cooled stirrer to give a clear UV inkjet ink. The viscosity was 16 mPa·s.

Clear Ink Composition

| | | |
|---|---|---|
| (A) N-Vinylcaprolactam | 25.0 | parts |
| (B) FANCRYL 512A | 51.4 | parts |
| NK ester AMP-10G | 10.0 | parts |
| FIRSTCURE ST-1 | 0.05 | parts |
| (C) Lucirin TPO (photoinitiator manufactured by BASF) | 8.5 | parts |
| (C) Benzophenone (photoinitiator) | 3.0 | parts |
| (C) IRGACURE 184 (photoinitiator manufactured by CSC) | 2.0 | parts |
| (F) BYK-307 (surfactant manufactured by BYK Chemie) | 0.05 | parts |

Evaluation of Ink

Inkjet recording was carried out using the ink composition thus obtained. An image having a film thickness of 12 μm could be printed. The results of evaluation of the curability and flexibility of the cured film are given in Table 1.

Example 11

The components below were stirred using a high-speed water-cooled stirrer to give a cyan UV inkjet ink. The viscosity was 17 mPa·s.

| | | |
|---|---|---|
| (D) (E) Cyan mill base A | 6.0 | parts |
| (A) N-Vinylcaprolactam | 25.0 | parts |
| (B) FANCRYL 513A | 35.4 | parts |
| NK ester AMP-10G | 20.0 | parts |
| FIRSTCURE ST-1 | 0.05 | parts |
| (C) Lucirin TPO (photoinitiator manufactured by BASF) | 8.5 | parts |
| (C) Benzophenone (photoinitiator) | 3.0 | parts |
| (C) IRGACURE 184 (photoinitiator manufactured by CSC) | 2.0 | parts |
| (F) BYK-307 (surfactant manufactured by BYK Chemie) | 0.05 | parts |

Evaluation of Ink

Inkjet recording was carried out using the ink composition thus obtained. The results of evaluation of the curability are given in Table 1.

Example 12

The components below were stirred using a high-speed water-cooled stirrer to give a cyan UV inkjet ink. The viscosity was 17 mPa·s.

Cyan Ink Composition

| | |
|---|---|
| (D) (E) Cyan mill base A | 6.0 parts |
| (B) Compound example M-1 | 20.4 parts |
| (A) N-Vinylcaprolactam | 25.0 parts |
| NK ester AMP-10G | 35.0 parts |
| FIRSTCURE ST-1 | 0.05 parts |
| (C) Lucirin TPO (photoinitiator manufactured by BASF) | 8.5 parts |
| (C) Benzophenone (photoinitiator) | 3.0 parts |
| (C) IRGACURE 184 (photoinitiator manufactured by CSC) | 2.0 parts |
| (F) BYK-307 (surfactant manufactured by BYK Chemie) | 0.05 parts |

Evaluation of Ink

Inkjet recording was carried out using the ink composition thus obtained. The results of evaluation of the curability are given in Table 1.

Example 13

The components below were stirred using a high-speed water-cooled stirrer to give a cyan UV inkjet ink. The viscosity was 17 mPa·s.

Cyan Ink Composition

| | |
|---|---|
| (D) (E) Cyan mill base A | 6.0 parts |
| (A) N-Vinylcaprolactam | 25.0 parts |
| (B) FANCRYL 512A | 35.4 parts |
| NK ester AMP-10G | 19.0 parts |
| FIRSTCURE ST-1 | 0.05 parts |
| (C) Lucirin TPO (photoinitiator manufactured by BASF) | 8.5 parts |
| (C) Benzophenone (photoinitiator) | 3.0 parts |
| (C) IRGACURE 184 (photoinitiator manufactured by CSC) | 2.0 parts |
| (F) BYK-307 (surfactant manufactured by BYK Chemie) | 0.05 parts |
| FIRSTCURE ITX | 1.0 parts |

Evaluation of Ink

Inkjet recording was carried out in the same manner as in the above-mentioned inkjet recording except that, after landing, UV light was focused to give an exposure area illumination intensity of 350 mW/cm² and a cumulative light intensity on an image of 1,500 mJ/cm², and the lamp employed an NCCU033 UV-LED lamp (manufactured by Nichia Corporation). The results of evaluation of the curability are given in Table 1.

Example 14

The components below were stirred using a high-speed water-cooled stirrer to give a cyan UV inkjet ink. The viscosity was 17 mPa·s.

Cyan Ink Composition

| | |
|---|---|
| (D) (E) Cyan mill base A | 6.0 parts |
| (A) N-Vinylcaprolactam | 25.0 parts |
| (B) FANCRYL 512A | 35.4 parts |
| NK ester AMP-10G | 18.0 parts |
| FIRSTCURE ST-1 | 0.05 parts |
| (C) Lucirin TPO (photoinitiator manufactured by BASF) | 8.5 parts |
| (C) Benzophenone (photoinitiator) | 3.0 parts |
| (C) IRGACURE 184 (photoinitiator manufactured by CSC) | 2.0 parts |
| (F) BYK-307 (surfactant manufactured by BYK Chemie) | 0.05 parts |
| FIRSTCURE ITX | 3.0 parts |

Evaluation of Ink

Inkjet recording was carried out in the same manner as in the above-mentioned inkjet recording except that, after landing, UV light was focused to give an exposure area illumination intensity of 450 mW/cm² and a cumulative light intensity on an image of 8,000 mJ/cm², and the lamp employed an SHP270W super high pressure mercury lamp (manufactured by PHOENIX Electric Co., Ltd.), which is generally used for a projector, etc. There were no dots missing in the image thus obtained, and a vivid image having a film thickness of 12 μm was formed. The results of evaluation of the curability, flexibility of the cured film, and adhesion are given in Table 1.

Comparative Example 1

The components below were stirred using a high-speed water-cooled stirrer to give a cyan UV inkjet ink. The viscosity was 24 mPa·s.

Cyan ink composition

| | |
|---|---|
| (D) (E) Cyan mill base A | 6.0 parts |
| (B) FANCRYL 512A | 80.4 parts |
| FIRSTCURE ST-1 | 0.05 parts |
| (C) Lucirin TPO (photoinitiator manufactured by BASF) | 8.5 parts |
| (C) Benzophenone (photoinitiator) | 3.0 parts |
| (C) IRGACURE 184 (photoinitiator manufactured by CSC) | 2.0 parts |
| (F) BYK-307 (surfactant manufactured by BYK Chemie) | 0.05 parts |

Evaluation of Ink

Inkjet recording was carried out using the ink composition thus obtained. The results of evaluation of the curability are given in Table 1.

Comparative Example 2

The components below were stirred using a high-speed water-cooled stirrer to give a cyan UV inkjet ink. The viscosity was 20 mPa·s.

Cyan Ink Composition

| | |
|---|---|
| (D) (E) Cyan mill base A | 6.0 parts |
| (B) FANCRYL 512A | 55.4 parts |
| NK ester AMP-10G | 25.0 parts |
| FIRSTCURE ST-1 | 0.05 parts |
| (C) Lucirin TPO (photoinitiator manufactured by BASF) | 8.5 parts |
| (C) Benzophenone (photoinitiator) | 3.0 parts |
| (C) IRGACURE 184 (photoinitiator manufactured by CSC) | 2.0 parts |
| (F) BYK-307 (surfactant manufactured by BYK Chemie) | 0.05 parts |

Evaluation of Ink

Inkjet recording was carried out using the ink composition thus obtained. The results of evaluation of the curability are given in Table 1.

Comparative Example 3

The components below were stirred using a high-speed water-cooled stirrer to give a cyan UV inkjet ink. The viscosity was 15 mPa·s.

Cyan Ink Composition

| | |
|---|---|
| (D) (E) Cyan mill base A | 6.0 parts |
| (A) N-Vinylcaprolactam | 25.0 parts |
| NK ester AMP-10G | 55.4 parts |
| FIRSTCURE ST-1 | 0.05 parts |
| (C) Lucirin TPO (photoinitiator manufactured by BASF) | 8.5 parts |
| (C) Benzophenone (photoinitiator) | 3.0 parts |
| (C) IRGACURE 184 (photoinitiator manufactured by CSC) | 2.0 parts |
| (F) BYK-307 (surfactant manufactured by BYK Chemie) | 0.05 parts |

Evaluation of Ink

Inkjet recording was carried out using the ink composition thus obtained. The results of evaluation of the curability are given in Table 1.

Comparative Example 4

The components below were stirred using a high-speed water-cooled stirrer to give a cyan UV inkjet ink. The viscosity was 15 mPa·s.

Cyan Ink Composition

| | |
|---|---|
| (D) (E) Cyan mill base A | 6.0 parts |
| NK ester AMP-10G | 80.4 parts |
| FIRSTCURE ST-1 | 0.05 parts |
| (C) Lucirin TPO (photoinitiator manufactured by BASF) | 8.5 parts |
| (C) Benzophenone (photoinitiator) | 3.0 parts |
| (C) IRGACURE 184 (photoinitiator manufactured by CSC) | 2.0 parts |
| (F) BYK-307 (surfactant manufactured by BYK Chemie) | 0.05 parts |

Evaluation of Ink

Inkjet recording was carried out using the ink composition thus obtained. The results of evaluation of the curability are given in Table 1.

Example 15

Preparation of Support

A melt was prepared using an aluminum alloy containing Si (0.06 wt %), Fe (0.30 wt %), Cu (0.025 wt %), Mn (0.001 wt %), Mg (0.001 wt %), Zn (0.001 wt %), and Ti (0.03 wt %), the remainder being Al and its inevitable impurities, and it was subjected to a melt treatment and filtration, and then formed into an ingot having a thickness of 500 mm and a width of 1,200 mm by a DC casting method. After the surface thereof was shaved off by an average thickness of 10 mm by means of a scalping machine, it was thermally maintained at 550° C. for about 5 hours, and when the temperature dropped to 400° C., it was made into a rolled sheet having a thickness of 2.7 mm by means of a hot rolling mill. It was further thermally treated at 500° C. by means of a continuous annealing machine, and then finished so as to have a thickness of 0.24 mm by means of cold rolling, thus giving an aluminum sheet of JIS 1050 material. The aluminum thus obtained had an average crystal minor axis of 50 μm and an average crystal major axis of 300 μm. After making the width of this aluminum 1,030 mm, it was subjected to the surface treatment below to give an aluminum support.

Surface Treatment

The surface treatment involved consecutively carrying out the various treatments (i) to (x) below. After each treatment and washing with water, liquid was removed by a nip roll.

(i) Mechanical Roughening Treatment

The surface of the aluminum sheet was subjected to a mechanical roughening treatment by means of a rotating roll-shaped nylon brush while supplying a suspension of an abrasive (pumice) having a specific gravity of 1.12 in water as an abrasive slurry to the surface of the aluminum sheet. The abrasive had an average particle size of 30 μm and a maximum particle size of 100 μm. The material of the nylon brush

TABLE 1

| | | | | Formulation | | | | | |
|---|---|---|---|---|---|---|---|---|---|
| | Lamp | Viscosity [mPa·s] | Color | Amount of NVC added [wt %] | Component (B) | Amount of component (B) added [wt %] | Other monomer | Amount of other monomer added [wt %] | Curability | Flexibility |
| Ex. 1 | HAN250NL | 17 | Cyan | 25.0 | FA512A | 35.4 | PEA | 20.0 | 3 | 4 |
| Ex. 2 | HAN250NL | 19 | Magenta | 25.0 | FA512A | 35.4 | PEA | 14.0 | 3 | 4 |
| Ex. 3 | HAN250NL | 19 | Yellow | 25.0 | FA512A | 35.4 | PEA | 14.0 | 3 | 4 |
| Ex. 4 | HAN250NL | 17 | Black | 25.0 | FA512A | 35.4 | PEA | 20.0 | 3 | 4 |
| Ex. 5 | HAN250NL | 18 | Cyan | 26.0 | FA512A | 35.4 | PEA, DPCA | 15.4 | 3 | 4 |
| Ex. 6 | HAN250NL | 20 | Magenta | 22.0 | FA512A | 35.4 | PEA, DPCA | 17.7 | 3 | 4 |
| Ex. 7 | HAN250NL | 20 | Yellow | 24.0 | FA512A | 35.4 | PEA, DPCA | 18.7 | 3 | 4 |
| Ex. 8 | HAN250NL | 18 | Black | 26.0 | FA512A | 35.4 | PEA, DPCA | 15.4 | 3 | 4 |
| Ex. 9 | HAN250NL | 24 | White | 36.4 | FA512A | 31.0 | PEA | 10.0 | 3 | 4 |
| Ex. 10 | HAN250NL | 16 | Clear | 25.0 | FA512A | 51.4 | PEA | 10.0 | 3 | 4 |
| Ex. 11 | HAN250NL | 17 | Cyan | 25.0 | FA513A | 35.4 | PEA | 20.0 | 3 | 4 |
| Ex. 12 | HAN250NL | 17 | Cyan | 25.0 | Compound Ex. M-1 | 20.4 | PEA | 35.0 | 3 | 4 |
| Ex. 13 | NCCU033 | 17 | Cyan | 25.0 | FA512A | 35.4 | PEA | 20.0 | 3 | 4 |
| Ex. 14 | SHP270W | 17 | Cyan | 25.0 | FA512A | 35.4 | PEA | 20.0 | 3 | 4 |
| Comp. Ex. 1 | HAN250NL | 24 | Cyan | — | FA512A | 80.4 | — | — | 3 | 2 |
| Comp. Ex. 2 | HAN250NL | 20 | Cyan | — | FA512A | 55.4 | PEA | 25.0 | 3 | 2 |
| Comp. Ex. 3 | HAN250NL | 15 | Cyan | 25.0 | — | — | PEA | 55.4 | 2 | 3 |
| Comp. Ex. 4 | HAN250NL | 15 | Cyan | — | — | — | PEA | 80.4 | 1 | 3 | was nylon-6,10, the bristle length was 45 mm, and the diameter of the bristles was 0.3 mm. The nylon brush was formed by making holes in a stainless steel tube having a diameter of 300 mm and densely implanting the bristles. Three rotating brushes were used. The distance of two support rolls (φ 200 mm) below the brush was 300 mm. The brush rolls were pressed against the aluminum sheet so that the load on a drive motor for rotating the brushes increased by 7 kW from the load before pressing the brush rolls. The direction of rotation of the brushes was the same as the direction in which the aluminum sheet moved. The rotational speed of the brushes was 200 rpm.

(ii) Alkali Etching Treatment

The aluminum sheet obtained above was subjected to an etching treatment by means of a spray using an aqueous solution having a sodium hydroxide concentration of 2.6 wt %, an aluminum ion concentration of 6.5 wt %, and a temperature of 70° C. so as to dissolve 10 g/m² of the aluminum sheet. Subsequently, it was washed with water by means of a spray.

(iii) Desmutting Treatment

A desmutting treatment was carried out by means of a spray using an aqueous solution having a nitric acid concentration of 1 wt % and a temperature of 30° C. (containing 0.5 wt % of aluminum ion), and following this washing with water was carried out by means of a spray. The aqueous solution of nitric acid used in the desmutting treatment employed liquid waste from a step involving carrying out an electrochemical roughening treatment using alternating current in an aqueous solution of nitric acid.

(iv) Electrochemical Roughening Treatment

An electrochemical roughening treatment was carried out consecutively using an ac voltage of 60 Hz. An electrolytic solution in this process was a 10.5 g/L aqueous solution of nitric acid (containing 5 g/L of aluminum ion and 0.007 wt % of ammonium ion), and the solution temperature was 50° C. The electrochemical roughening treatment was carried out using as an ac power source waveform a trapezoidal rectangular wave alternating current having a duty ratio of 1:1 and a time from zero to peak current value of 0.8 msec, with a carbon electrode as a counter electrode. Ferrite was used as an auxiliary anode.

The current density was 30 A/dm² as a peak current value, and the quantity of electricity was 220 C/dm² as the total quantity of electricity when the aluminum sheet was the anode. 5% of the current flowing from the power source was diverted to the auxiliary anode. Following this, washing with water was carried out by means of a spray.

(v) Alkali Etching Treatment

The aluminum sheet was subjected to an etching treatment at 32° C. by means of a spray using an aqueous solution having a sodium hydroxide concentration of 26 wt % and an aluminum ion concentration of 6.5 wt % so as to dissolve 0.50 g/m² of the aluminum sheet, remove a smut component containing aluminum hydroxide as a main component formed in the previous paragraph when carrying out the electrochemical roughening treatment using alternating current, and dissolve an edge portion of a pit formed to thus make the edge portion smooth. Subsequently, washing with water was carried out by means of a spray.

(vi) Desmutting Treatment

A desmutting treatment was carried out by means of a spray using an aqueous solution having a nitric acid concentration of 15 wt % and a temperature of 30° C. (containing 4.5 wt % of aluminum ion), and following this washing with water was carried out by means of a spray. The aqueous solution of nitric acid used in the desmutting treatment employed liquid waste from the step involving carrying out the electrochemical roughening treatment using alternating current in an aqueous solution of nitric acid.

(vii) Electrochemical Roughening Treatment

An electrochemical roughening treatment was carried out consecutively using an ac voltage of 60 Hz. The electrolytic solution in this process was a 5.0 g/L aqueous solution of hydrochloric acid (containing 5 g/L of aluminum ion), and the temperature was 35° C. The electrochemical roughening treatment was carried out using as an ac power source waveform a trapezoidal rectangular wave alternating current having a duty ratio of 1:1 and a time from zero to peak current value of 0.8 msec, with a carbon electrode as a counter electrode. Ferrite was used as an auxiliary anode.

The current density was 25 A/dm² as a peak current value, and the quantity of electricity was 50 C/dm² as the total quantity of electricity when the aluminum sheet was the anode. Following this, washing with water was carried out by means of a spray.

(viii) Alkali Etching Treatment

The aluminum sheet was subjected to an etching treatment at 32° C. by means of a spray using an aqueous solution having a sodium hydroxide concentration of 26 wt % and an aluminum ion concentration of 6.5 wt % so as to dissolve 0.12 g/m² of the aluminum sheet, remove a smut component containing aluminum hydroxide as a main component formed in the previous paragraph when carrying out the electrochemical roughening treatment using alternating current, and dissolve an edge portion of a pit formed to thus make the edge portion smooth. Subsequently, washing with water was carried out by means of a spray.

(ix) Desmutting Treatment

A desmutting treatment was carried out by means of a spray using an aqueous solution having a sulfuric acid concentration of 25 wt % and a temperature of 60° C. (containing 0.5 wt % of aluminum ion), and following this washing with water was carried out by means of a spray.

(x) Anodizing Treatment

An anodizing treatment was carried out using an anodizing system (first and second electrolysis section lengths 6 m each, first and second power supply section lengths 3 m each, and first and second electrode section lengths 2.4 m each). Sulfuric acid was used as an electrolytic solution supplied to the first and second electrolysis sections. Each of the electrolytic solutions had a sulfuric acid concentration of 50 g/L (containing 0.5 wt % of aluminum ion) and a temperature of 20° C. Following this, washing with water was carried out by means of a spray. The final amount of oxidized film was 2.7 g/m².

Hydrophilized Layer by Means of Silicate

The support thus treated was immersed in an aqueous solution of No. 3 sodium silicate at 70° C. for 13 sec., then washed with water and dried. The surface roughness Ra obtained as an average value of 5 measurements using a Surfcom model 575A surface roughness meter manufactured by Tokyo Seimitsu Co., Ltd. with a cutoff value of 0.8 mm for a measurement length of 3 mm was 0.55 μm.

Ink-receiving Layer

An ink-receiving layer coating solution having the composition below was applied using a wire-wound bar and dried at 80° C. for 15 sec. to thus form a coated film, thereby giving a support with an ink-receiving layer. The amount of ink-receiving layer applied was 20 mg/m$^2$.

TABLE 2

| Classification | Name | Amount added (parts by weight) |
|---|---|---|
| Water-soluble polymer | Poly(sodium p-styrenesulfonate) | 0.25 |
| Surfactant | Compound (F-1) | 0.2 |
| Colorant | Acid Violet 34 Dye | 0.05 |
| Coating activator | TSA-731 (silicone-based surfactant, manufactured by Toshiba Silicone Co., Ltd.) | 0.0005 |
| Solvent | Ion-exchanged water | 60 |
| Solvent | Methanol | 40 |

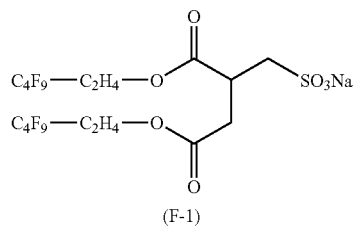

(F-1)

Inkjet Recording

Inkjet recording was carried out, on a support on which the above-mentioned ink-receiving layer had been formed, using the same ink composition as that of Example 1 as follows.

When forming an image, as a head a shear mode piezo head (CA3: minimum droplet size 6 pL, number of nozzles 318, nozzle density 150 nozzles/25.4 mm, manufactured by Toshiba Tec Corporation) was used, and a head scanning type image formation system equipped with this head on a mobile carriage was employed. The ink was charged into an ink tank with a capacity of 2 L that had a pressure reduction function and the ink, which was degassed by removing gas that had dissolved in the ink by reducing the pressure to −40 kPa, was introduced into the above-mentioned head by a Teflon (registered trademark) flexible tube having an inner diameter of 2 mm via a hydrostatic pressure control tank (capacity 50 mL). By controlling the height of the hydrostatic pressure tank relative to the head, the internal pressure of the head was adjusted to −6.6 kPa, and the meniscus shape in the nozzle portion of the head was controlled. Furthermore, water was circulated in the head by a circulating water-type temperature control system (SCINICS CH-201) so that the ink temperature within the head became 45° C. The drive voltage for the head was 24 V, and discharge was carried out in 8-value multi drop mode or binary mode. The frequencies for dot formation were 4.8 kHz and 12 kHz respectively. The imaging pitch was 600 dpi in the head scan direction (head scan speed 203 mm/s)×600 dpi in the recording medium transport direction for the 8-value multi drop mode, and 1,200 dpi in the head scan direction (head scan speed 254 mm/s)×1,200 dpi in the recording medium transport direction for the binary mode, that is, bidirectional interlace printing was carried out by the head while stepping the recording medium. Furthermore, as cleaning means for the above-mentioned head, wiping means comprising a nonwoven cloth that carried out wiping without contacting the nozzle plate of the head was provided, and cleaning was carried out as appropriate.

Exposure 1 sec. to 60 sec. after the inkjet recording, exposure to light was carried out using a 3 kW high pressure mercury lamp to thus form a lithographic printing plate.

Image Evaluation

The diameter of image dots thus obtained was measured using an optical microscope, and was found to be 35 μm.

Printing Test

Printing was carried out using the lithographic printing plate thus obtained, without subjecting it to a gum treatment, with a Lithron printer manufactured by Komori Corporation, using IF102 dampening water (manufactured by Fuji Photo Film Co., Ltd.), and DIC-GEOS (N) black ink manufactured by Dainippon Ink and Chemicals, Incorporated. 10,000 sheets or greater of high quality printed material free from white dropouts in an image area and stains in a non-image area were obtained, and it has been ascertained that the plate life is at a level that causes no problems in practical use.

What is claimed is:

1. An ink composition comprising:
   (A) an N-vinyllactam;
   (B) a monomer represented by Formula (I); and
   (C) a radical polymerization initiator,

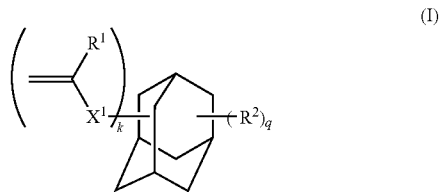

(I)

wherein $R^1$ denotes a hydrogen atom, a halogen atom, or an alkyl group having 1 to 4 carbons, $X^1$ denotes a divalent linking group, each $R^2$ independently denotes a substituent, k denotes an integer of 1 to 6, each q independently denotes an integer of 0 to 5, the k $R^1$s, the k $X^1$s, and the q $R^2$s may each be identical to or different from each other; and one carbon atom in the adamantane framework in Formula (I) may be replaced by a carbonyl bond (—C(O)—) and/or an ester bond (—C(O)O—).

2. The ink composition according to claim 1, wherein at least one of the monomers represented by Formula (I) is a monofunctional acrylate.

3. The ink composition according to claim 1, wherein the N-vinyllactam (A) is N-vinylcaprolactam.

4. The ink composition according to claim 1, further comprising (D) a colorant.

5. An inkjet recording method comprising:
   ($a^1$) a step of discharging the ink composition according to claim 1 onto a recording medium; and
   ($b^1$) a step of curing the ink composition by irradiating the discharged ink composition with actinic radiation.

6. The inkjet recording method according to claim 5, wherein the actinic radiation is UV radiation having a peak light emission wavelength in the range of 350 to 420 nm and is emitted by a UV radiation-emitting light-emitting diode that gives a maximum illumination intensity on the surface of a recording medium of 10 to 2,000 mW/cm$^2$.

7. A process for producing a lithographic printing plate, the process comprising:
   ($a^2$) a step of discharging the ink composition according to claim 1 onto a hydrophilic support; and (b²) a step of curing the ink composition by irradiating the discharged ink composition with actinic radiation so as to form a hydrophobic image on the hydrophilic support by curing the ink composition.

8. An ink composition comprising:
(A) an N-vinyllactam;
(B) a monomer represented by Formula (II);
(C) a radical polymerization initiator; and phenoxyethyl acrylate,

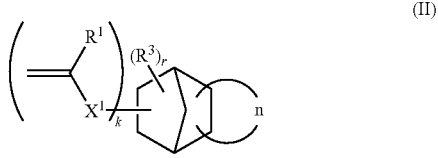
(II)

wherein $R^1$ denotes a hydrogen atom, a halogen atom, or an alkyl group having 1 to 4 carbons, $X^1$ denotes a divalent linking group, each $R^3$ independently denotes a substituent, k denotes an integer of 1 to 6, each r independently denotes an integer of 0 to 5, n denotes a cyclic hydrocarbon structure, the cyclic hydrocarbon structure may comprise in addition to hydrocarbon bonds a carbonyl bond (—C(O)—) and/or an ester bond (—C(O)O—) the k $R^1$s, the k $X^1$s, and the r $R^3$s may each be identical to or different from each other; and one carbon atom in the norbornene framework in Formula (II) may be replaced by an ether bond (—O—) and/or an ester bond (—C(O)O—).

9. The ink composition according to claim 8, wherein at least one of the monomers represented by Formula (II) is a monofunctional acrylate.

10. The ink composition according to claim 8, wherein the monomer represented by Formula (II) above is a monomer represented by Formula (III), Formula (IV), or Formula (V),

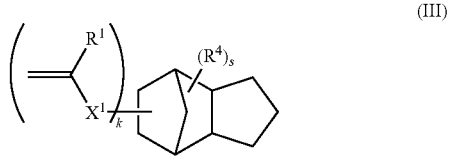
(III)

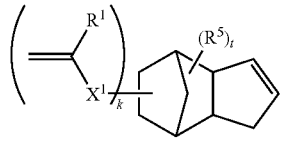
(IV)

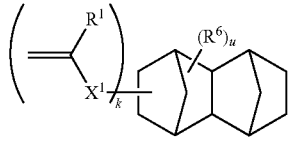
(V)

wherein $R^1$ denotes a hydrogen atom, a halogen atom, or an alkyl group having 1 to 4 carbons, $X^1$ denotes a divalent linking group, $R^4$, $R^5$, and $R^6$ independently denote a substituent, k denotes an integer of 1 to 6, s, t, and u independently denote an integer of 0 to 5, and the s $R^4$s, the t $R^5$s, and the u $R^6$s may each be identical to or different from each other.

11. The ink composition according to claim 8, wherein the N-vinyllactam (A) is N-vinylcaprolactam.

12. The ink composition according to claim 8, further comprising (D) a colorant.

13. An inkjet recording method comprising:
(a¹) a step of discharging the ink composition according to claim 8 onto a recording medium; and
(b¹) a step of curing the ink composition by irradiating the discharged ink composition with actinic radiation.

14. The inkjet recording method according to claim 13, wherein the actinic radiation is UV radiation having a peak light emission wavelength in the range of 350 to 420 nm and is emitted by a UV radiation-emitting light-emitting diode that gives a maximum illumination intensity on the surface of a recording medium of 10 to 2,000 mW/cm².

15. A process for producing a lithographic printing plate, the process comprising:
(a²) a step of discharging the ink composition according to claim 8 onto a hydrophilic support; and
(b²) a step of curing the ink composition by irradiating the discharged ink composition with actinic radiation so as to form a hydrophobic image on the hydrophilic support by curing the ink composition.

* * * * *